(12) United States Patent
Doi et al.

(10) Patent No.: US 9,652,620 B2
(45) Date of Patent: May 16, 2017

(54) QUANTUM COMMUNICATION DEVICE, QUANTUM COMMUNICATION METHOD, AND COMPUTER PROGRAM PRODUCT

(71) Applicant: Kabushiki Kaisha Toshiba, Minato-ku (JP)

(72) Inventors: Kazuaki Doi, Kawasaki (JP); Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 128 days.

(21) Appl. No.: 14/579,045

(22) Filed: Dec. 22, 2014

(65) Prior Publication Data
US 2015/0193306 A1 Jul. 9, 2015

(30) Foreign Application Priority Data
Jan. 8, 2014 (JP) .................................. 2014-001943

(51) Int. Cl.
G06F 21/60 (2013.01)
H04L 9/08 (2006.01)
G06F 11/14 (2006.01)

(52) U.S. Cl.
CPC ........ *G06F 21/602* (2013.01); *G06F 11/1402* (2013.01); *H04L 9/0858* (2013.01);
(Continued)

(58) Field of Classification Search
CPC ............... G06F 11/1402; G06F 21/602; G06F 2201/86; H04L 9/0858; H04L 2209/34; H04L 9/0891
(Continued)

(56) References Cited

U.S. PATENT DOCUMENTS 5,793,091 A * 8/1998 Devoe ................. G06N 99/002
257/17
6,460,178 B1 * 10/2002 Chan ................... G06F 9/44521
717/116
(Continued)

FOREIGN PATENT DOCUMENTS

| JP | 4-346929 A | 12/1992 |
|---|---|---|
| JP | 4459526 B2 | 4/2010 |
| JP | 2010/0251976 A | 11/2010 |

OTHER PUBLICATIONS

Wiles, Quantum Bit Error Rates in Quantum Key Distribution Using Entangled Photons, Sep. 22, 2005, ECA, pp. 1-30.*
(Continued)

*Primary Examiner* — John J Tabone, Jr.
(74) *Attorney, Agent, or Firm* — Oblon, McClelland, Maier & Neustadt, L.L.P.

(57) ABSTRACT

According to an embodiment, a quantum communication device includes a sift processor, an estimator, a determination unit, and a corrector. The sift processor is configured to acquire sift processing data by referring to a cryptographic key bit string in a predetermined bit string with a reference basis randomly selected from a plurality of bases via a quantum communication channel. The estimator is configured to acquire an estimated error rate of the sift processing data. The determination unit is configured to determine order of the sift processing data in which an error is to be corrected based on the estimated error rate and difference data between a processing speed of error correcting processing and a processing speed of privacy amplification processing. The corrector is configured to acquire one piece of the sift processing data in the order determined by the determination unit, and generate error correcting processing data.

11 Claims, 19 Drawing Sheets

(52) U.S. Cl.
CPC ........ *H04L 9/0891* (2013.01); *G06F 2201/86* (2013.01); *H04L 2209/34* (2013.01)

(58) Field of Classification Search
USPC ........ 714/704, 746, 758, 780; 713/176, 189; 380/256, 278, 44, 255, 279
See application file for complete search history.

(56) References Cited

U.S. PATENT DOCUMENTS

| | | | | |
|---|---|---|---|---|
| 6,804,816 | B1* | 10/2004 | Liu | G06F 8/20 709/223 |
| 6,895,092 | B2* | 5/2005 | Tomita | H04L 9/0662 380/256 |
| 7,246,240 | B2* | 7/2007 | Chuang | H04L 9/3247 380/256 |
| 7,461,323 | B2* | 12/2008 | Matsumoto | H03M 13/095 713/150 |
| 7,609,839 | B2* | 10/2009 | Watanabe | H04L 9/0858 380/255 |
| 9,160,529 | B2* | 10/2015 | Tajima | H04L 9/0858 |
| 2001/0055389 | A1* | 12/2001 | Hughes | H04L 9/0858 380/44 |
| 2002/0025041 | A1* | 2/2002 | Tomita | H04L 9/0662 380/256 |
| 2004/0190719 | A1* | 9/2004 | Lo | 380/255 |
| 2005/0036624 | A1* | 2/2005 | Kent | H04L 9/0858 380/277 |
| 2005/0135620 | A1* | 6/2005 | Kastella | H04L 9/12 380/256 |
| 2006/0059403 | A1* | 3/2006 | Watanabe | H04L 9/0858 714/758 |
| 2013/0315395 | A1* | 11/2013 | Jacobs | H04L 9/0852 380/278 |
| 2014/0341575 | A1* | 11/2014 | Choi | H04B 10/70 398/51 |
| 2015/0195087 | A1* | 7/2015 | Doi | H04L 9/0858 380/278 |
| 2015/0304106 | A1* | 10/2015 | Yoshino | H04L 9/0852 250/204 |

OTHER PUBLICATIONS

Elliott et al., Darpa Quantum Network Testbed, Jul. 2007, BBN Technologies, pp. 1-156.*
Charles H. Bennett, et al., "Quantum Cryptography: Public Key Distribution and Coin Tossing", Proceedings of IEEE International Conference on Computers, Systems and Signal Processing, (Dec. 10-12, 1984), pp. 175-179.
I.P.S. Choi, et al., "Quantum Key Distribution on a 10Gbis WDM-PON", Optics Express 9601, vol. 18, No. 9, (Apr. 2010), pp. 1-3.
Charles H. Bennett, et al., "Generalized Privacy Amplification", IEEE Transactions on Information Theory, vol. 41, No. 6, (Nov. 1995), pp. 1915-1923.

* cited by examiner

E, S, T: {0, 1}

$$[E_1 \quad E_2 \quad \cdots \quad E_{m-1} \quad E_m] \times \begin{bmatrix} T_m & T_{m+1} & \cdots & T_{m+n-2} & T_{m+n-1} \\ T_{m-1} & T_m & \cdots & T_{m+n-3} & T_{m+n-2} \\ \vdots & \vdots & \ddots & \vdots & \vdots \\ T_2 & T_3 & \cdots & T_n & T_{n+1} \\ T_1 & T_2 & \cdots & T_{n-1} & T_n \end{bmatrix}$$

$\underset{=}{\parallel} E$                Toeplitz MATRIX $\parallel T$ $= [S_1 \quad S_2 \quad \cdots \quad S_{n-1} \quad S_n] \times$ (mod 2)

$\parallel S$

FIG.7A

| SIFT PROCESSING DATA | ESTIMATED QbER |
|---|---|
| Data-1 | 1.80E-02 |
| Data-2 | 1.80E-02 |
| Data-3 | 1.80E-02 |
| Data-4 | 1.80E-02 |
| Data-5 | 9.00E-03 |
| Data-6 | 9.00E-03 |
| Data-7 | 9.00E-03 |
| Data-8 | 9.00E-03 |
| Data-9 | 1.80E-02 |
| Data-10 | 1.80E-02 |
| Data-11 | 1.80E-02 |
| Data-12 | 1.80E-02 |
| Data-13 | 9.00E-03 |
| Data-14 | 9.00E-03 |
| Data-15 | 9.00E-03 |
| Data-16 | 9.00E-03 |

FIG.7B

| | SIFT PROCESSING DATA | ESTIMATED QbER |
|---|---|---|
| COMBINATION (1) { | Data-5 | 9.00E-03 |
| | Data-1 | 1.80E-02 |
| COMBINATION (2) { | Data-6 | 9.00E-03 |
| | Data-2 | 1.80E-02 |
| COMBINATION (3) { | Data-7 | 9.00E-03 |
| | Data-3 | 1.80E-02 |
| COMBINATION (4) { | Data-8 | 9.00E-03 |
| | Data-4 | 1.80E-02 |
| COMBINATION (5) { | Data-13 | 9.00E-03 |
| | Data-9 | 1.80E-02 |
| COMBINATION (6) { | Data-14 | 9.00E-03 |
| | Data-10 | 1.80E-02 |
| COMBINATION (7) { | Data-15 | 9.00E-03 |
| | Data-11 | 1.80E-02 |
| COMBINATION (8) { | Data-16 | 9.00E-03 |
| | Data-12 | 1.80E-02 |

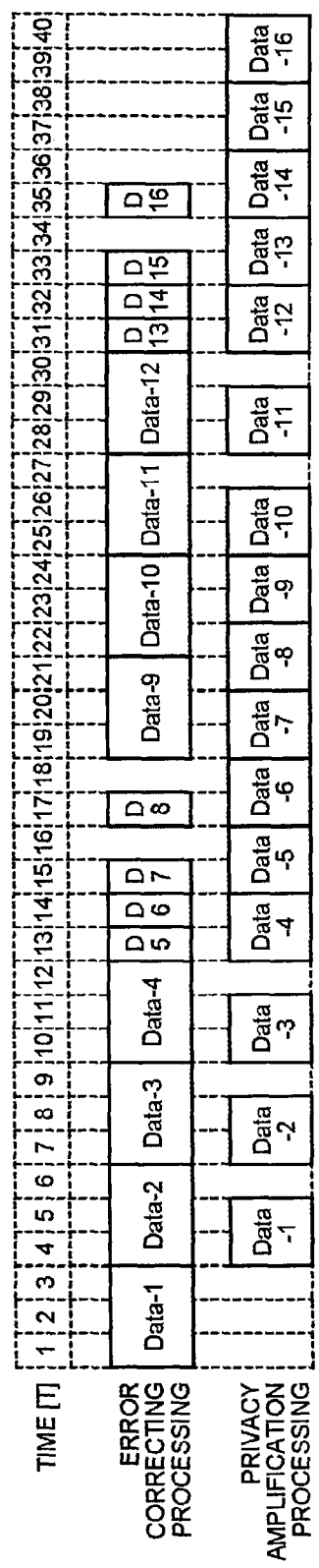

FIG.8B

| TIME [T] | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|---|---|---|---|---|---|---|---|---|---|---|---|---|---|---|---|---|---|---|---|
| ERROR CORRECTING PROCESSING | D-5 | | | | D-6 | Data-2 | | | D-7 | Data-3 | | | D-8 | Data-4 | | | D-13 | Data-9 | | | D-14 | Data-10 | | | D-15 | Data-11 | | | D-16 | Data-12 | | | | | | | | | | |
| | | Data-1 | | | | | | | | | | | | | | | | | | | | | | | | | | | | | | | | | | | | | | |
| PRIVACY AMPLIFICATION PROCESSING | | | | | Data-5 | Data-1 | Data-6 | Data-2 | Data-7 | Data-3 | Data-8 | Data-4 | Data-13 | Data-9 | Data-14 | Data-10 | Data-15 | Data-11 | Data-16 | Data-12 | | | | | | | | | | | | | | | | | | | | |

FIG.10A

| SIFT PROCESSING DATA | ESTIMATED QbER |
|---|---|
| Data-1 | 1.80E-02 |
| Data-2 | 1.80E-02 |
| Data-3 | 1.80E-02 |
| Data-4 | 1.80E-02 |
| Data-5 | 1.20E-02 |
| Data-6 | 1.20E-02 |
| Data-7 | 9.00E-03 |
| Data-8 | 9.00E-03 |
| Data-9 | 9.00E-03 |
| Data-10 | 9.00E-03 |
| Data-11 | 1.20E-02 |
| Data-12 | 1.20E-02 |

FIG.10B

| | SIFT PROCESSING DATA | ESTIMATED QbER |
|---|---|---|
| COMBINATION (1) | Data-5 | 1.20E-02 |
| | Data-6 | 1.20E-02 |
| COMBINATION (2) | Data-11 | 1.20E-02 |
| | Data-12 | 1.20E-02 |
| COMBINATION (3) | Data-7 | 9.00E-03 |
| | Data-1 | 1.80E-02 |
| COMBINATION (4) | Data-8 | 9.00E-03 |
| | Data-2 | 1.80E-02 |
| COMBINATION (5) | Data-9 | 9.00E-03 |
| | Data-3 | 1.80E-02 |
| COMBINATION (6) | Data-10 | 9.00E-03 |
| | Data-4 | 1.80E-02 |

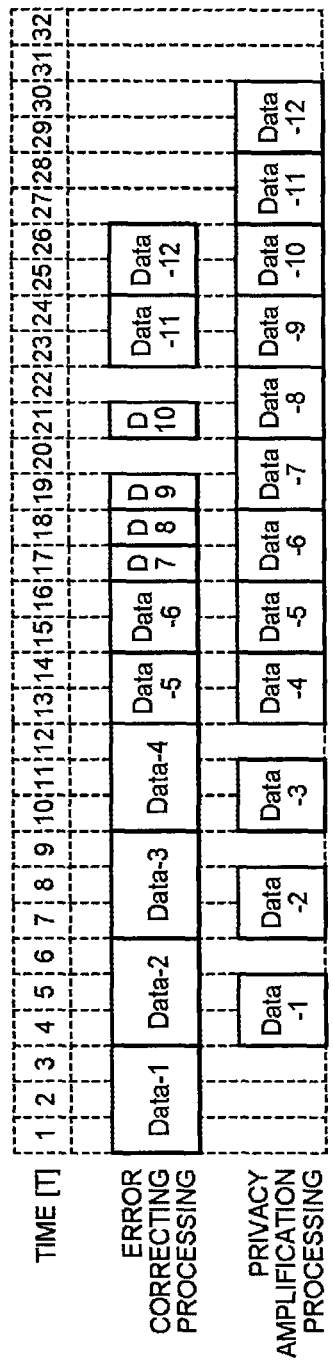

| ESTIMATED QbER | ESTIMATION ERROR |
|---|---|
| 0 ≤ QbER < (5e-3) | a |
| (5e-3) ≤ QbER < (1e-2) | b |
| (1e-2) ≤ QbER < (1.5e-2) | c |
| (1.5e-2) ≤ QbER < (2e-2) | d |
| (2e-2) ≤ QbER < (2.5e-2) | e |

QUANTUM COMMUNICATION DEVICE, QUANTUM COMMUNICATION METHOD, AND COMPUTER PROGRAM PRODUCT

CROSS-REFERENCE TO RELATED APPLICATION

This application is based upon and claims the benefit of priority from Japanese Patent Application No. 2014-001943, filed on Jan. 8, 2014; the entire contents of which are incorporated herein by reference.

FIELD

Embodiments described herein relate generally to a quantum communication device, a quantum communication method, and a computer program product.

BACKGROUND

Development of information and communication technology leads to an exchange of various types of data, and it is becoming a big problem how to ensure privacy (safety) of the data to be transmitted. Cryptographs currently used for ensuring privacy of data, such as RSA, base safety on cryptanalysis time by a computer based on computational complexity. However, further improvement in computational ability of a computer may allow easy cryptanalysis of RSA or the like.

In contrast, a quantum key distribution (QKD) system for achieving data privacy based on a physical law of light is known. The quantum key distribution system (quantum cryptographic communication system) is a system capable of detecting eavesdropping on a communication channel by handling a quantum state of light as data representing zero or one. The quantum key distribution system is expected as a cryptographic method for achieving information-theoretical safety that does not base safety on cryptanalysis time by a computer.

Generally in a quantum communication device used for a quantum key distribution system, error correcting (EC) processing and privacy amplification (PA) processing are performed.

However, conventional techniques do not take into consideration a difference in processing speeds between the error correcting processing and the privacy amplification processing, and thus cryptographic key data cannot be generated efficiently.

BRIEF DESCRIPTION OF THE DRAWINGS

FIG. 7A is a diagram illustrating an example of sift processing data (in time-series order) in a buffer according to the first embodiment;

FIG. 7B is a diagram illustrating an example of processing order determined by a determination unit according to the first embodiment;

FIG. 8A is a diagram illustrating an example of a timing chart (in time-series order) of the error correcting processing and the privacy amplification processing according to the first embodiment;

FIG. 8B is a diagram illustrating an example of the timing chart (after processing order change) of the error correcting processing and the privacy amplification processing according to the first embodiment;

FIG. 10A is a diagram illustrating an example of the sift processing data (in time-series order) in the buffer according to a second embodiment;

FIG. 10B is a diagram illustrating an example of the processing order determined by the determination unit according to the second embodiment;

FIG. 11A is a diagram illustrating an example of the timing chart (in time-series order) of the error correcting processing and the privacy amplification processing according to the second embodiment;

FIG. 11B is a diagram illustrating an example of the timing chart (after processing order change) of the error correcting processing and the privacy amplification processing according to the second embodiment;

FIG. 13 is a diagram illustrating an example of an estimation error of an estimated QbER according to the third embodiment;

DETAILED DESCRIPTION

According to an embodiment, a quantum communication device includes a receiver, a sift processor, an estimator, a first storage, a second storage, a determination unit, a corrector, a measurement unit, and a privacy amplifier. The receiver is configured to receive a cryptographic key bit represented by one basis among a plurality of bases using a quantum state of a photon via a quantum communication channel, and acquire a cryptographic key bit string including a plurality of received cryptographic key bits. The sift processor is configured to acquire sift processing data by referring to the cryptographic key bit string in a predetermined bit string with a reference basis randomly selected from the plurality of bases. The estimator is configured to acquire an estimated error rate by estimating an error rate of the sift processing data from an error rate of part of the sift processing data. The first storage is configured to store the sift processing data and the estimated error rate in association with each other. The second storage is configured to store difference data indicating a difference between a processing speed of error correcting processing of the sift processing data and a processing speed of privacy amplification processing of the sift processing data for each of error rates of a plurality of sift processing data. The determination unit is configured to determine order of the sift processing data in which an error is to be corrected based on the estimated error rate and the difference data when a data volume of the sift processing data stored in the first storage is equal to or greater than a first threshold. The corrector is configured to acquire one piece of the sift processing data from among the plurality of pieces of sift processing data from the first storage in the order determined by the determination unit, and generate error correcting processing data by correcting the acquired sift processing data by the error correcting processing. The measurement unit is configured to measure the error rate of the sift processing data before correction by comparing the error correcting processing data with the sift processing data before the correction corresponding to the error correcting processing data. The privacy amplifier is configured to generate cryptographic key data based on the error rate measured by the measurement unit by applying the privacy amplification processing to the error correcting processing data.

First Embodiment

Figure 1:
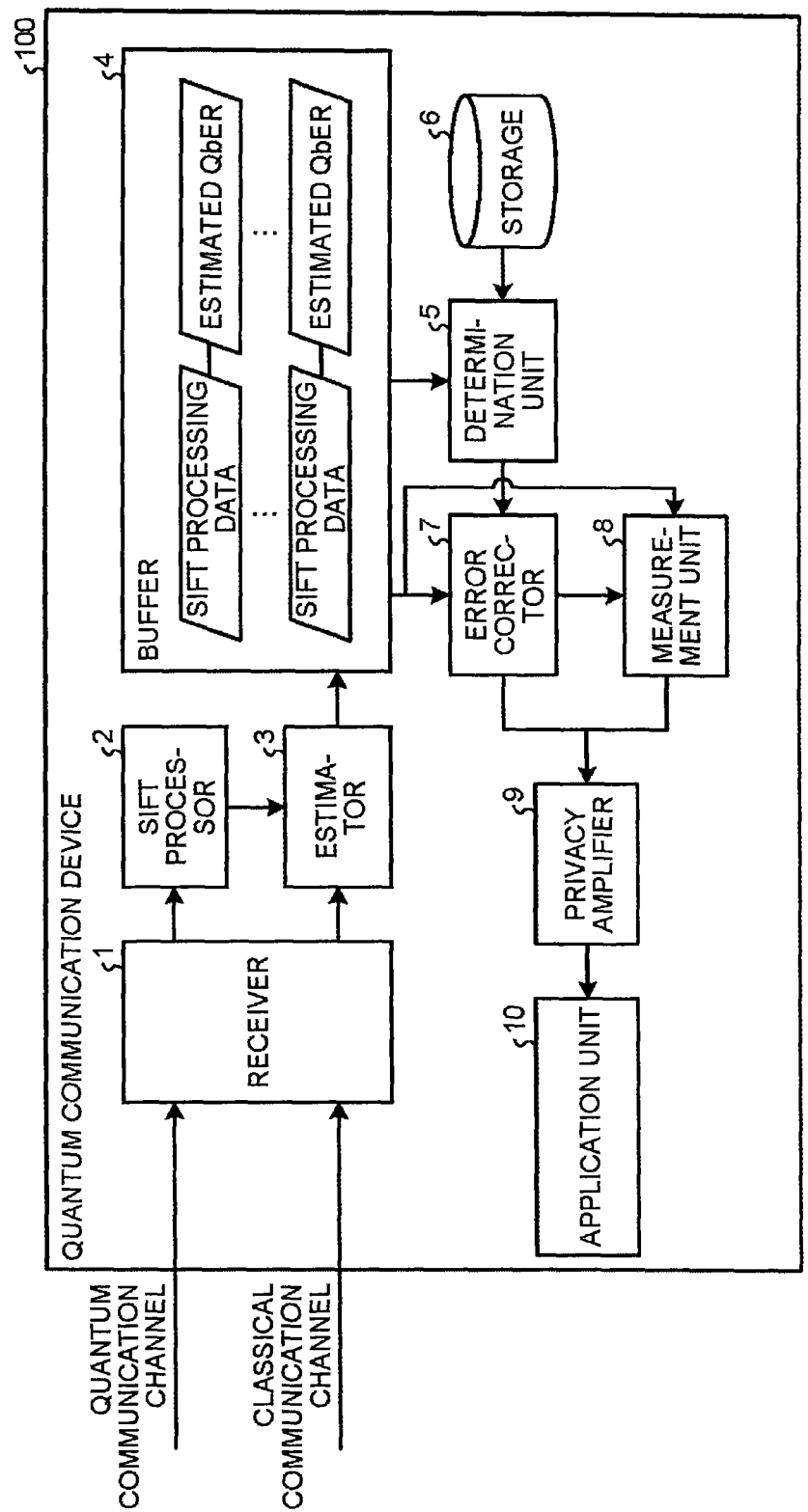
FIG. 1 is a diagram illustrating an example of a configuration of a quantum communication device according to a first embodiment.

FIG. 1 is a diagram illustrating an example of a configuration of a quantum communication device 100 according to a first embodiment. The quantum communication device 100 according to the first embodiment includes a receiver 1, a sift processor 2, an estimator 3, a buffer 4 (example of a first storage), a determination unit. 5, a storage 6 (example of a second storage), an error correcting (EC) unit 7, a measurement unit 8, a privacy amplification (PA) unit 9, and an application unit 10.

The receiver 1 receives a cryptographic key bit from a transmission side device via a quantum communication channel using a quantum state of a photon. The transmission side device represents the cryptographic key bit by one basis among a plurality of bases using the quantum state of a photon. As the quantum state of a photon, polarization, phase, and the like of the photon are used. As the basis, when polarization is used, for example, rectilinear polarization (vertical (0) and horizontal (1)) or circular polarization (right-handed (0) and left-handed (1)) is used. The receiver 1 receives the plurality of cryptographic key bits via the quantum communication channel, and acquires a cryptographic key bit string including the plurality of received cryptographic key bits. A BB84 protocol is known as an example of a transmission/reception method of such a cryptographic key bit string. The receiver 1 transmits the cryptographic key bit string to the sift processor 2. The receiver 1 receives part of sift processing data described later from the transmission side device via a classical communication channel (conventional communication channel) that is not the quantum communication channel. The receiver 1 transmits the part of the sift processing data described later to the estimator 3.

The sift processor 2 receives the cryptographic key bit string from the receiver 1. The sift processor 2 refers to the cryptographic key bit string in a predetermined bit string to acquire a bit string (hereinafter referred to as "sift processing data") with a reference basis that a receiving side randomly selects from the plurality of bases. Here, when the basis used by the transmission side device does not coincide with the reference basis, the sift processor 2 does not use information about the cryptographic key bit. For example, when the cryptographic key bit is transmitted using the quantum state of rectilinear polarization of a photon, and when the sift processor 2 uses the quantum state of circular polarization of light of a photon as the reference basis, the sift processor 2 does not use information about the cryptographic bit. The sift processor 2 transmits the sift processing data to the estimator 3.

The estimator 3 receives the sift processing data from the sift processor 2, and receives part of the sift processing data from the receiver 1. The estimator 3 performs estimation processing of an estimated quantum bit error rate (QbER). Specifically, the estimator 3 compares part of the sift processing data that the receiver 1 receives via the classical communication channel with data corresponding to part of the sift processing data that the receiver 1 receives via the classical communication channel among the pieces of sift processing data received from the sift processor 2. Thus, the estimator 3 calculates a QbER of part of the sift processing data. The estimator 3 estimates the estimated QbER of the sift processing data from the QbER of part of the sift processing data. The estimator 3 associates the sift processing data with the estimated QbER of the sift processing data, and transmits the sift processing data and the estimated QbER to the buffer 4.

Here, the QbER (example of an error rate) will be described. In QKD, a cryptographic key bit string is transmitted for each cryptographic key bit (one bit) using the quantum state of a quantum (photon). In accordance with an uncertainty principle that is one of basic principles of quantum mechanics, observation of a quantum changes the quantum state. This property causes the quantum state to change when an eavesdropper observes the quantum that includes the information about the cryptographic key bit that the transmission side device transmits on the quantum communication channel. This allows a receiving side device that receives the quantum to know that the quantum is observed by the eavesdropper. The QbER (quantum bit error rate) represents an error rate of the cryptographic key bit string resulting from changes in the quantum state. Variations in the QbER of the cryptographic key bit string transmitted on the quantum communication channel enables a check for the presence of eavesdropping on the quantum communication channel.

Specifically, when the eavesdropper eavesdrops on the cryptographic key bit string flowing through the quantum communication channel, the eavesdropper needs to eavesdrop on the cryptographic key bit string by a method identical to an acquisition method of the sift processing data by the above-mentioned sift processor 2. Accordingly, the eavesdropper can carry out successful eavesdropping only with a certain probability. For example, when there are two types of bases, the probability of successful eavesdropping will be ½. In addition, since the quantum state will change once the eavesdropper carries out eavesdropping, it is not possible to change the basis and to eavesdrop on the identical quantum state again. That is, since a correct value of the cryptographic key bit of which eavesdropping fails is unknown, even if the eavesdropper himself or herself creates the cryptographic key bit of which the eavesdropper fails in the eavesdropping and transmits the cryptographic key bit to the receiving side, it is not possible to transmit the correct value to the receiving side. This lowers the QbER calculated when the bases are consistent between the transmission side and the receiving side, and thus detects the eavesdropping. Even when the bases are consistent between the transmission side and the receiving side, since a constant QbER is obtained by noise on the quantum communication channel or by wrong detection by a photon-detecting device, the eavesdropping is detected when the constant QbER conspicuously varies.

The buffer 4 receives the sift processing data and the estimated QbER of the sift processing data. The buffer 4 associates the sift processing data with the estimated QbER of the sift processing data, and (temporarily) stores the sift processing data and the estimated QbER. The sift processing data in the buffer 4 is identified by identification information about the sift processing data. Examples of the identification information include address information that indicates a storage location of the sift processing data.

The determination unit 5 determines whether a data volume of the sift processing data stored in the buffer 4 is equal to or greater than a first threshold. When the data volume of the sift processing data stored in the buffer 4 is equal to or greater than the first threshold, the determination unit 5 determines order of the sift processing data in which an error is to be corrected based on difference data (see FIG. 6 described later) and the estimated QbER being associated with the sift processing data, the difference data representing a difference between an error correcting processing speed (throughput of error correcting processing) according to the QbER and a privacy amplification processing speed (throughput of privacy amplification processing) according to the QbER.

Figure 2:
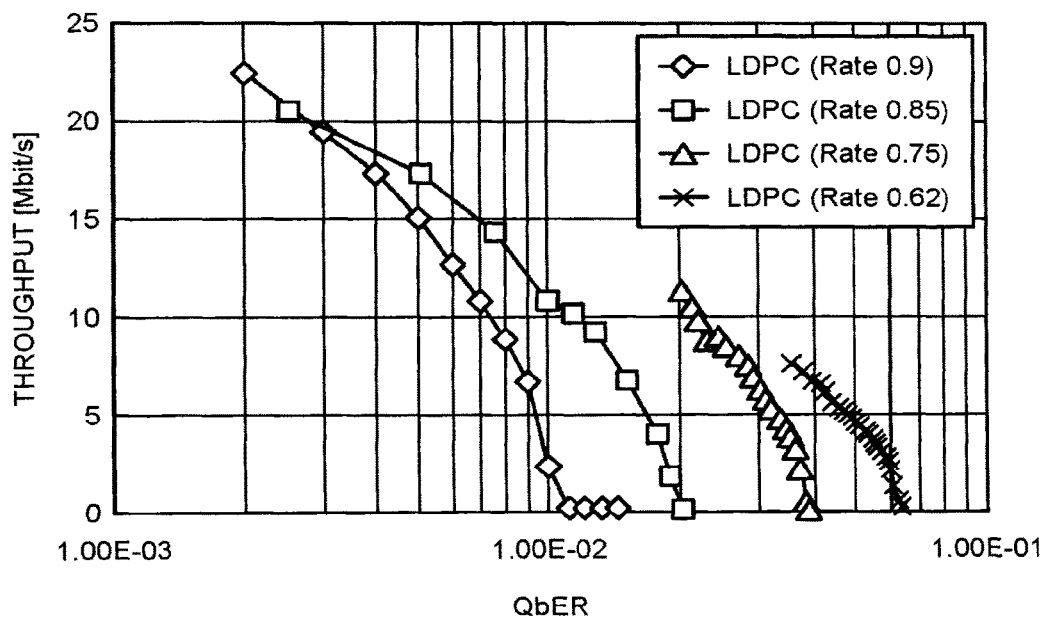
FIG. 2 is a diagram illustrating an example of throughput of error correcting processing according to the first embodiment.

First, a relationship between the QbER of the sift processing data to be processed and the throughput of the error correcting processing will be described. FIG. 2 is a diagram illustrating an example of the throughput of the error correcting processing according to the first embodiment. The horizontal axis of FIG. 2 represents the QbER. Values of the QbER are represented as floating point numbers. The vertical axis of FIG. 2 represents the throughput (Mbit/s). In the example of FIG. 2, a low-density-parity-check (LDPC) code is used for the error correcting processing. FIG. 2 illustrates that all the throughput of the error correcting processing using four different parameters (check matrix) decrease as the QbER increases.

The error correcting processing will be described now. The error correcting processing determines whether the sift processing data includes an error based on a result of multiplying the check matrix by the sift processing data (considering that the sift processing data is a vector having a component with a value of zero or one). This result is called a syndrome. The syndrome of a zero vector shows that the sift processing data does not include an error. The syndrome of not a zero vector shows that the sift processing data includes an error. Furthermore, in a resulting column vector, it is possible to specify (correct) a position of the error in the sift processing data depending on a position of the component that is not zero. Since a method of the error correcting processing that uses the check matrix is already well known, the description regarding the check matrix will be omitted in the description of the present embodiment.

Generally, an amount of the error correcting processing increases as the QbER increases. For an LDPC code, for example, an amount of decoding computations increases as the QbER of the sift processing data to be processed increases because the number of repeated decoding increases. That is, when hardware or software is implemented so that the parallel computation number of an LDPC decoding algorithm is constant, the throughput of the error correcting processing decreases.

Figure 3:
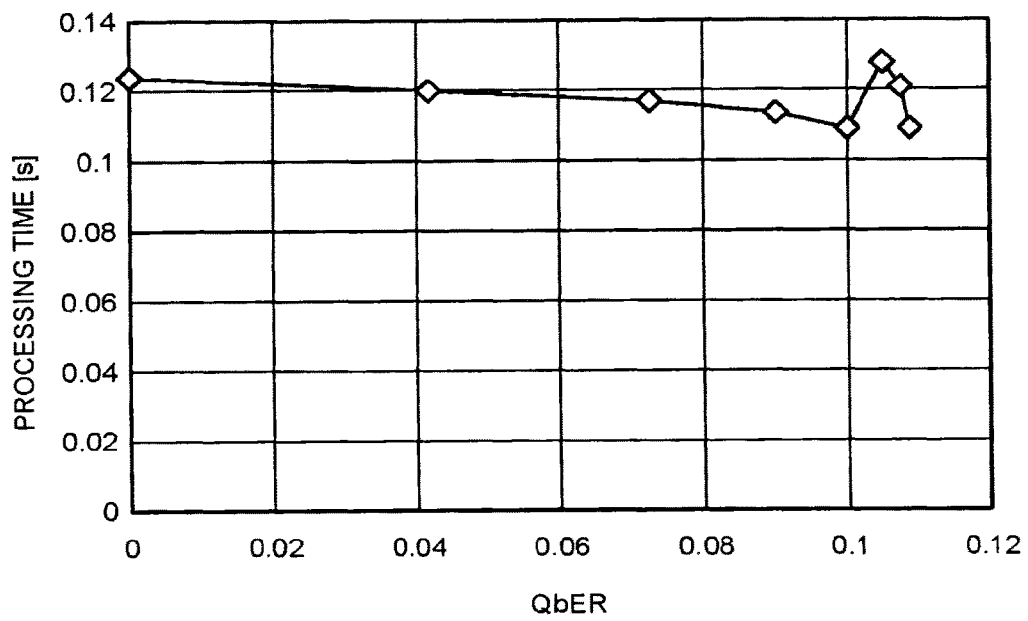
FIG. 3 is a diagram illustrating an example of processing time of privacy amplification processing according to the first embodiment.

Next, a relationship between the QbER of the sift processing data to be processed and a privacy amplification processing time will be described. FIG. 3 is a diagram illustrating an example of the privacy amplification processing time according to the first embodiment. The horizontal axis of FIG. 3 represents the QbER. The vertical axis of FIG. 3 represents processing time (second) of the privacy amplification processing. As illustrated in FIG. 3, the processing time of the privacy amplification processing is almost constant regardless of the QbER value.

Figures 4, 5:
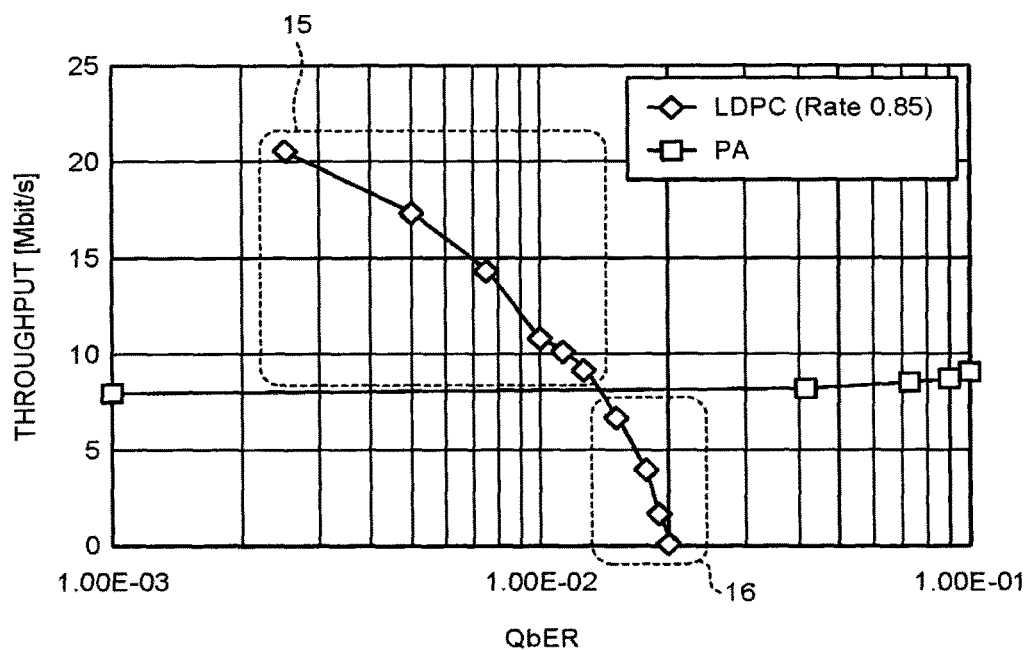
FIG. 4 is a diagram illustrating an example of the privacy amplification processing according to the first embodiment.
FIG. 5 is a diagram illustrating an example of a difference in the processing speed between the error correcting processing and the privacy amplification processing according to the first embodiment.

The privacy amplification processing will be described below. FIG. 4 is a diagram illustrating an example of the privacy amplification processing according to the first embodiment. The privacy amplification processing is processing for obtaining a bit string S used for cryptographic key data by multiplying input data E (error correcting processing data described later) by a special hash function such as a Toeplitz matrix T. The privacy amplification processing compresses the input data E into the bit string S having an output size corresponding to the hash function. The hash function is not limited to the Toeplitz matrix T, but may be another hash function as long as the hash function can be used for the privacy amplification processing.

Since it is highly likely that data is being eavesdropped on by the eavesdropper when the QbER of the sift processing data is big, a data length of the bit string S obtained after the privacy amplification processing of the input data E (error correcting processing data described later with the sift processing data corrected) becomes shorter. That is, among the bit string used for generation of the cryptographic key data, only safety-ensuring part of the data length of the bit string obtained from the sift processing data with a high possibility that data is being eavesdropped on by the eavesdropper is used. That is, when the QbER of the sift processing data is big, the column number of the Toeplitz matrix T for processing the input data E becomes smaller. Therefore, the amount of the privacy amplification processing decreases as the QbER increases.

The multiplication of matrices includes the computation of multiplying the input data E by each row of the Toeplitz matrix T. When hardware or software is implemented so that this computation is performed with a parallel number identical to a row number of the Toeplitz matrix T, regardless of changes in the column number of the Toeplitz matrix T, the computation is completed after a row size clock. Accordingly, the throughput of the privacy amplification processing becomes constant. It is assumed that, according to an implementation method of the privacy amplification processing of the quantum communication device 100 according to the present embodiment, the privacy amplification processing is implemented so that the throughput of the privacy amplification processing is constant without depending on the QbER. In other implementation methods, the throughput of the privacy amplification processing generally varies (decreases) in accordance with the QbER.

Since the privacy amplification processing is already well known, detailed description will be omitted. For example, details of the privacy amplification processing are disclosed in Charles H. Bennett, Gilles Brassard, Claude Crepeau, and Ueli M. Maurer, "Generalized Privacy Amplification", IEEE Transactions on Information Theory, Vol. 41, No. 6, November 1995.

Next, a difference in the processing speeds between the error correcting processing and the privacy amplification processing will be described. FIG. 5 is a diagram illustrating an example of the difference in the processing speeds between the error correcting processing (LDPC (Rate 0.85)) and the privacy amplification processing (PA) according to the first embodiment. The horizontal axis of FIG. 5 represents the QbER. Values of the QbER are represented as floating point numbers. The vertical axis of FIG. 5 represents the throughput (Mbit/s).

In a region 15, the throughput of the privacy amplification processing is lower than the throughput of the error correcting processing. The privacy amplification processing is performed after the error correcting processing. That is, when the error correcting processing and the privacy amplification processing are always performed in this state, an area for storing data (error correcting processing data described later) to be processed by the privacy amplification processing may overflow.

On the other hand, in a region 16, the throughput of the privacy amplification processing is higher than the throughput of the error correcting processing. That is, when the error correcting processing and the privacy amplification processing are always performed in this state, generation of the data (error correcting processing data described later) to be processed by the privacy amplification processing will take time, and latency will increase until the privacy amplification processing starts.

Next, a method will be described by which the determination unit 5 determines order of correcting the sift processing data accumulated in the buffer 4 using the difference between the processing speed of the error correcting processing and the processing speed of the privacy amplification processing.

Figure 6:
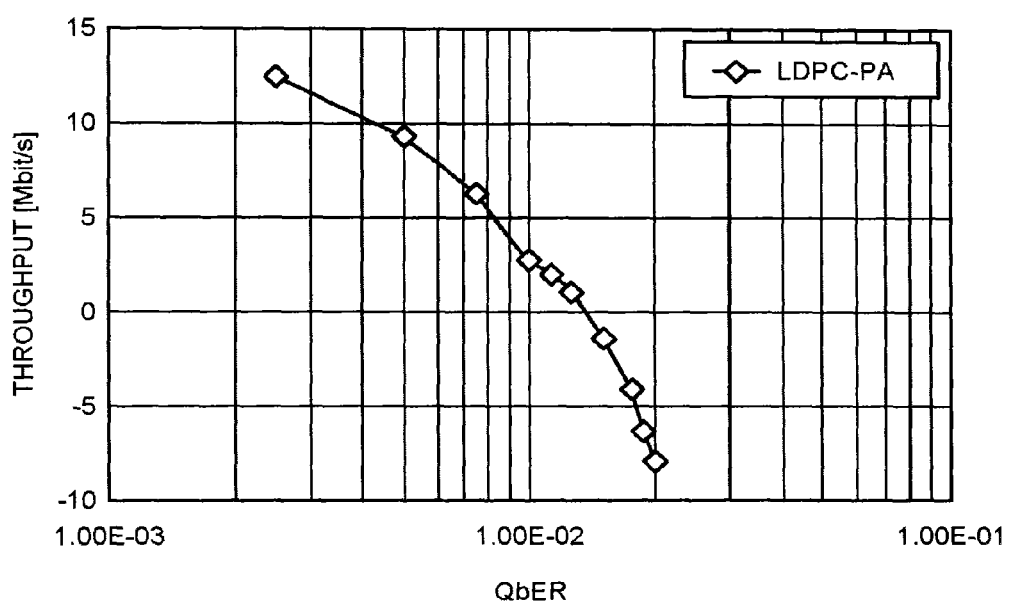
FIG. 6 is a diagram illustrating an example of a difference in the throughput between the error correcting processing and the privacy amplification processing according to the first embodiment.

FIG. 6 is a diagram illustrating an example of a difference in the throughput between the error correcting processing (LDPC) and the privacy amplification processing (PC) according to the first embodiment. The horizontal axis of FIG. 6 represents the QbER. Values of the QbER are represented as floating point numbers. The vertical axis of FIG. 6 represents the throughput (Mbit/s). The storage 6 stores the difference data according to the QbER illustrated in the graph of FIG. 6.

The determination unit 5 acquires the plurality of pieces of difference data by acquiring, from the storage 6, the piece of the difference data corresponding to the QbER that coincides with the estimated QbER, each of the estimated QbERs being associated with the sift processing data.

Next, the determination unit 5 performs correction order determination processing. Specifically, the determination unit 5 first combines two pieces of the difference data among the plurality of pieces of difference data so that a sum of two pieces of difference data is close to zero. Next, the determination unit 5 orders the combined difference data in arbitrary order while maintaining combination. Next, the determination unit 5 determines the order of correcting the error in the plurality of the sift processing data being associated with the estimated error rate that coincides with the error rate corresponding to the difference data in the order of the combined difference data.

The above-described correction order determination processing will be described with reference to a specific example. FIG. 7A is a diagram illustrating an example of the sift processing data (in time-series order) in the buffer according to the first embodiment. Specifically, FIG. 7A illustrates the sift processing data (Data-1 to Data-16) and the estimated QbER being associated with the sift processing data in time-series order in the order stored in the buffer 4.

First, the sift processing data with the estimated QbER of 1.80E-02 will be described. When the estimated QbER is 1.80E-02, the processing speed of the error correcting processing is 4 Mbit/s, and the processing speed of the privacy amplification processing is 8 Mbit/s (see FIG. 5). The difference between the processing speed of the error correcting processing and the processing speed of the privacy amplification processing is −4 Mbit/s (see FIG. 6). Accordingly, when the sift processing data being associated with the estimated QbER of 1.80E-02 continues, latency occurs before the privacy amplification processing starts.

On the other hand, when the estimated QbER is 9.00E-03, the processing speed of the error correcting processing is 12 Mbit/s, and the processing speed of the privacy amplification processing is 8 Mbit/s (see FIG. 5). The difference between the processing speed of the error correcting processing and the processing speed of the privacy amplification processing is 4 Mbit/s (see FIG. 6). Accordingly, when the sift processing data being associated with the estimated QbER of 9.00E-03 continues, the privacy amplification processing may fail to be performed in time, and the area for storing the input data E (error correcting processing data) of the privacy amplification processing may overflow.

FIG. 8A is a diagram illustrating an example of a timing chart (in time-series order) of the error correcting processing and the privacy amplification processing according to the first embodiment. A capacity of a storage area (buffer memory) for transmitting the error correcting processing data from the error corrector 7 to the privacy amplifier 9 is assumed to be twice the data length necessary for the privacy amplification processing. For example, when a row size of the Toeplitz matrix is 1M bit, the capacity of the buffer memory is 2M bit. Required processing time when processed in time-series order and required processing time when optimized are simply calculated. When the time required for the privacy amplification processing is 2T, from a ratio of the throughput of the error correcting processing to the throughput of the privacy amplification processing of FIG. 5, the error correcting processing time is 3T when the QbER=1.8E−2, and the error correcting processing time is 1T when the QbER=9E−3.

In the processing of Data-1 to 4, since the error correcting processing is slower, latency occurs in the privacy amplification processing. In the processing of Data-7 to 9 and Data-15 to 16, time slots exist during which the error correcting processing is not performed due to the capacity of the storage area. This is because, for example, the error correcting processing of next Data-8 is preferably performed when Data-7 is completed (15T), but the privacy amplification processing is processing Data-5 that is three pieces earlier. That is, since the error correcting processing data corresponding to Data-6 and the error correcting processing data corresponding to Data-7 exist in the storage area as the input data E for the privacy amplification processing, the error correcting processing of Data-8 cannot start.

In order to allow smooth performance of the error correcting processing and the privacy amplification processing, the determination unit 5 specifically determines the processing order of the sift processing data as follows.

FIG. 7B is a diagram illustrating an example of the processing order determined by the determination unit 5 according to the first embodiment. The determination unit 5 combines every two pieces of sift processing data based on the estimated QbER, and determines the processing order in the order of combinations from (1) to (8). Creation of the combination (1) of FIG. 7B will be specifically described. Since the estimated QbER of Data-5 is 9.00E-03, the difference between the processing speed (12 Mbit/s) of the error correcting processing of Data-5 and the processing speed (8 Mbit/s) of the privacy amplification processing is 4 Mbit/s (see FIG. 5 and FIG. 6).

On the other hand, since the estimated QbER of Data-1 is 1.80E-02, the difference between the processing speed (4 Mbit/s) of the error correcting processing of Data-1 and the processing speed (8 Mbit/s) of the privacy amplification processing is −4 Mbit/s (see FIG. 5 and FIG. 6). Accordingly, in a unit of the combination (1), the difference between the processing speed of the error correcting processing and the processing speed of the privacy amplification processing is 0 Mbit/s. Hereinafter, the determination unit 5 similarly creates the combinations (2) to (8), and determines the order of the sift processing data for performing the error correcting processing in the order of from the combination (1) to the combination (8).

The determination unit 5 determines the order so that an error is corrected, starting from the sift processing data having the smallest estimated QbER that is associated with the sift processing data among the pieces of combined sift processing data. For example, for the combination (1), the order is determined so that an error is corrected, starting from Data-5 having the smaller estimated QbER. This reduces the latency until the privacy amplification processing starts.

FIG. 8B is a diagram illustrating an example of a timing chart (after processing order change) of the error correcting processing and the privacy amplification processing according to the first embodiment. The timing chart of FIG. 8B illustrates that the latency occurs only in the first time slot in the privacy amplification processing, and that the processing proceeds smoothly after then. The comparison between FIG. 8A and FIG. 8B shows that a processing end time of the sift processing data for the first eight pieces is earlier in FIG. 8B by 4T. The processing end time of the sift processing data for the next eight pieces is earlier in FIG. 8B by 6T. Therefore, when processing is advanced in this state, it can be understood that a large difference will be generated in the processing end time.

Returning to FIG. 1, the determination unit 5 transmits data indicating the order of the sift processing data to be corrected to the error corrector 7.

The error corrector 7 receives the data indicating the order of the sift processing data to be corrected from the determination unit 5. The error corrector 7 performs error correcting processing of the sift processing data. Specifically, the error corrector 7 acquires one piece of sift processing data from the buffer 4 in the order determined by the determination unit 5 among the plurality of pieces of sift processing data. Then, the error corrector 7 generates the error correcting processing data by applying the correction processing to the acquired sift processing data with a predetermined parallel computation number. The error corrector 7 transmits the error correcting processing data to the measurement unit 8 and the privacy amplifier 9.

An error correcting code used for correction by the error corrector 7 may be an arbitrary code. For example, besides the above-mentioned LDPC code, a Reed-Solomon (RS) code and Bose-Chaudhuri-Hocquenghem (BCH) code may be used. In addition, a Cascade protocol used as an error correcting system for a BB84 method may be used.

While the error corrector 7 corrects the sift processing data so that the syndrome becomes a zero vector, the error corrector 7 may correct the data so that the syndrome is a non-zero vector and coincides with a syndrome of the transmission side sift processing data. In correction, it is necessary to receive the transmission side syndrome from the transmission side device via the classical communication channel, and to input the syndrome into the error corrector 7.

The measurement unit 8 receives the error correcting processing data from the error corrector 7. The measurement unit 8 acquires the sift processing data before the correction corresponding to the error correcting processing data from the buffer 4. The measurement unit 8 measures the QbER of the sift processing data by comparing the error correcting processing data with the sift processing data before the correction corresponding to the error correcting processing data. The measurement unit 8 transmits the measured QbER to the privacy amplifier 9.

The privacy amplifier 9 receives the error correcting processing data from the error corrector 7, and receives the QbER of the error correcting processing data from the measurement unit 8. The privacy amplifier 9 performs privacy amplification processing of the error correcting processing data with a predetermined parallel computation number based on the QbER of the error correcting processing data. Then, the privacy amplifier 9 generates the cryptographic key data to be shared with the transmission side device using the bit string obtained by privacy amplification processing of the error correcting processing data. The privacy amplifier 9 transmits the generated cryptographic key data to the application unit 10.

The application unit 10 receives the cryptographic key data from the privacy amplifier 9. The application unit 10 performs data encryption and decryption using the cryptographic key data. The application unit 10 transmits and receives the encrypted data with the transmission side device.

Figure 9:
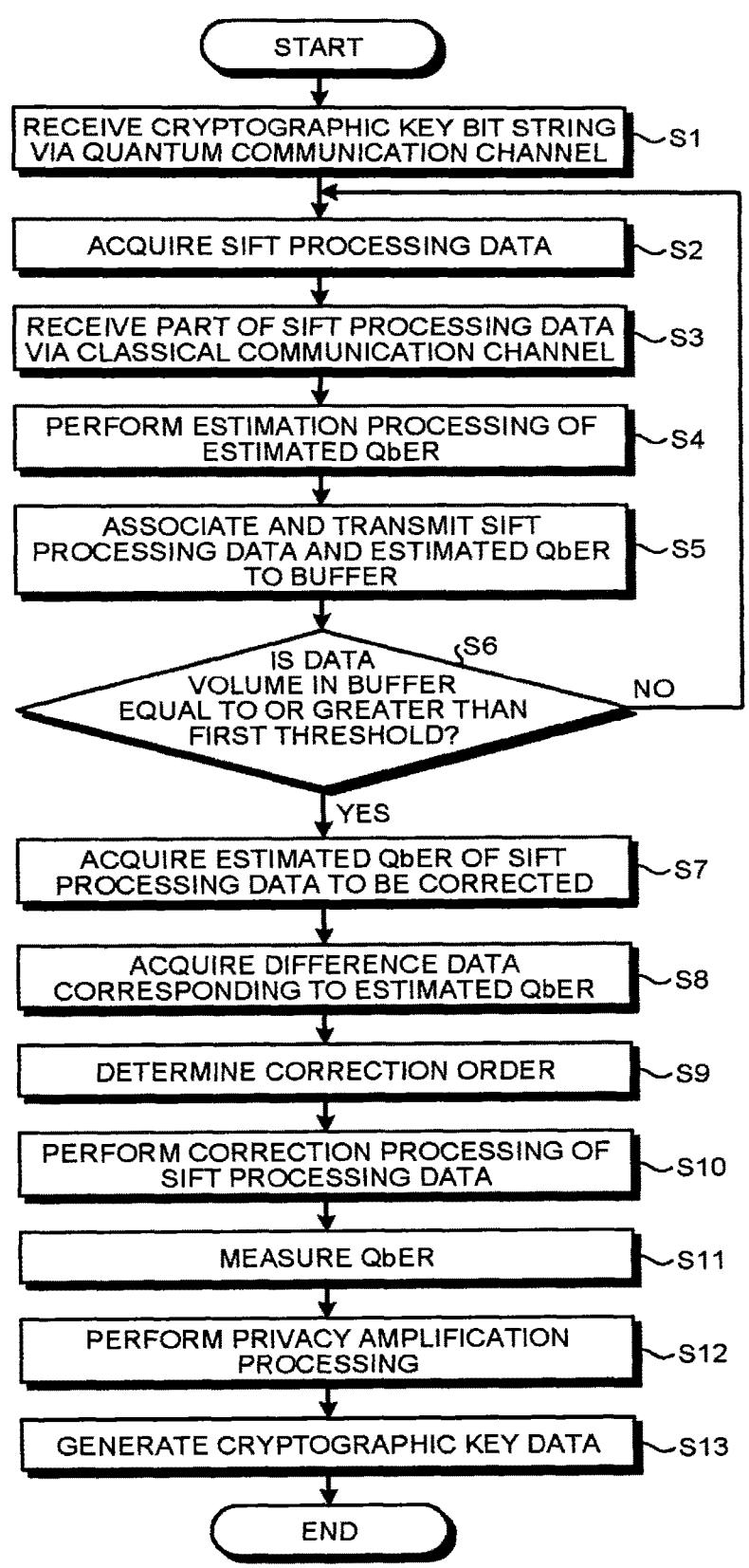
FIG. 9 is a flow chart illustrating an example of a quantum communication method according to the first embodiment.

Next, a quantum communication method of the first embodiment will be described with reference to a flow chart. FIG. 9 is a flow chart illustrating an example of the quantum communication method according to the first embodiment. The receiver 1 receives the cryptographic key bit string from the transmission side device via the quantum communication channel using the quantum state of a photon (step S1). Next, the sift processor 2 acquires the sift processing data by referring to the cryptographic key bit string in a predetermined bit string with the reference basis randomly selected from the bases (step S2).

Next, the receiver 1 receives part of the sift processing data from the transmission side device via the classical communication channel (conventional communication channel) that is not the quantum communication channel (step S3). Next, the estimator 3 performs estimation processing of the above-mentioned estimated QbER (step S4). Next, the estimator 3 associates the sift processing data with the estimated QbER of the sift processing data, and transmits the sift processing data and the estimated QbER to the buffer 4 (step S5).

Next, the determination unit 5 determines whether the data volume of the sift processing data stored in the buffer 4 is equal to or greater than the first threshold (step S6). When the data volume is equal to or greater than the first threshold (step S6, Yes), the determination unit 5 acquires the estimated QbER of each piece of the sift processing data from the buffer 4 (step S7). When the data volume is not equal to or greater than the first threshold (step S6, No), the determination unit 5 returns to the processing of step S2.

Next, the determination unit 5 acquires, from the storage 6, the difference data corresponding to the QbER that coincides with the estimated QbER, each of the estimated QbERs (step S8). Next, the determination unit 5 performs processing (above-mentioned correction order determination processing) of determining the order of the plurality of the sift processing data in which an error is to be corrected based on the estimated QbER being associated with the sift processing data and the difference data (step S9). Next, the error corrector 7 performs correction processing of the above-mentioned sift processing data (step S10). Next, the measurement unit 8 measures the QbER of the sift processing data by comparing the error correcting processing data with the sift processing data before correction corresponding to the error correcting processing data (step S11). Next, the privacy amplifier 9 performs privacy amplification processing of the error correcting processing data based on the measured QbER (step S12). Next, the privacy amplifier 9 generates the cryptographic key data to be shared with the transmission side device using the bit string obtained by privacy amplification processing of the error correcting processing data (step S13).

As described above, the quantum communication device 100 according to the first embodiment includes the determination unit for determining the order of the sift processing data in which an error is to be corrected based on the difference data indicating the difference between the error correcting processing speed according to the QbER and the privacy amplification processing speed according to the QbER, and on the estimated QbER being associated with the sift processing data. This allows the quantum communication device 100 of the present embodiment to reduce the processing time of the error correcting processing and the processing time of the privacy amplification processing, and thus allows efficient cryptographic key data generation.

Second Embodiment

Next, a second embodiment will be described. A determination unit 5 of the second embodiment orders combined difference data in order of the combined difference data with a sum of absolute values of two pieces of difference data closer to zero. In other words, the determination unit 5 orders sift processing data from the sift processing data with a difference between a processing speed of error correcting processing and a processing speed of privacy amplification processing closer to zero.

A configuration of a quantum communication device 100 according to the second embodiment is identical to a configuration of the quantum communication device 100 according to the first embodiment, and thus description will be omitted.

Correction order determination processing of the determination unit 5 of the second embodiment will be described with reference to a specific example. FIG. 10A is a diagram illustrating an example of the sift processing data (in time-series order) in a buffer according to the second embodiment. Specifically, FIG. 10A illustrates the sift processing data (Data-1 to Data-12) and an estimated QbER being associated with the sift processing data in time-series order in which the sift processing data and the estimated QbER are stored in the buffer 4.

The sift processing data with the estimated QbER of 1.20E-02 will be described. When the estimated QbER is 1.20E-02, the processing speed of the error correcting processing is 8 Mbit/s, and the processing speed of the privacy amplification processing is 8 Mbit/s (see FIG. 5). The difference between the processing speed of the error correcting processing and the processing speed of the privacy amplification processing is 0 Mbit/s (see FIG. 6).

The case where the estimated QbER is 1.80E-02 and the case where the estimated QbER is 9.00E-03 have been described in the first embodiment, and thus description will be omitted.

FIG. 11A is a diagram illustrating an example of a timing chart (in time-series order) of the error correcting processing and the privacy amplification processing according to the second embodiment. In processing of Data-1 to 4, since the error correcting processing is slower, latency occurs in the privacy amplification processing. In processing of Data-9 to 11, time slots exist during which the error correcting processing is not performed due to a capacity of a storage area. This is because, for example, the error correcting processing of next Data-10 is preferably performed when Data-9 is completed (19T), but the privacy amplification processing is performing processing of Data-7 that is three pieces earlier. That is, since the error correcting processing data corresponding to Data-8 and the error correcting processing data corresponding to Data-9 exist in the storage area as input data E for the privacy amplification processing, the error correcting processing of Data-10 cannot start.

In order to allow smooth performance of the error correcting processing and the privacy amplification processing, the determination unit 5 specifically determines processing order of the sift processing data as follows.

FIG. 10B is a diagram illustrating an example of the processing order determined by the determination unit 5 of the first embodiment. The determination unit 5 combines every two pieces of the sift processing data based on the estimated QbER, and determines the processing order in the order of combinations from (1) to (6). Creation of the combination (1) of FIG. 10B will be specifically described. Since the estimated QbER of each piece of Data-5 and Data-6 is 1.20E-02, the difference between the processing speed (8 Mbit/s) of the error correcting processing and the processing speed (8 Mbit/s) of the privacy amplification processing is 0 Mbit/s (see FIG. 5 and FIG. 6). That is, the sum of the absolute value of the difference data of Data-5 and the absolute value of the difference data of Data-6 is zero. Therefore, the determination unit 5 combines Data-5 and Data-6 to create the combination (1), and determines the combination (1) as a combination of the sift processing data in which an error is to be corrected first. The determination unit 5 creates the combination (2) in the same manner as in the combination (1). The combinations (3) to (6) are similar to the combinations (3) to (6) of the first embodiment, and thus description will be omitted.

Figure 11B:
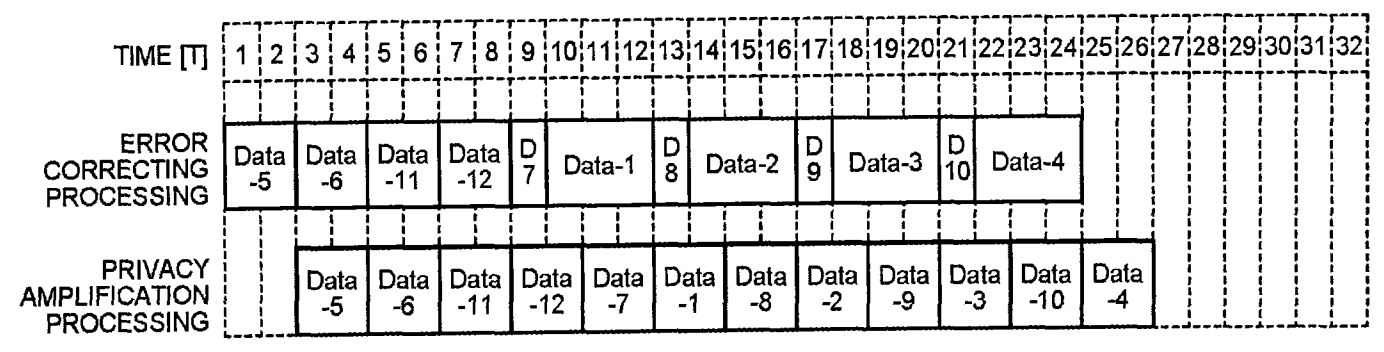

FIG. 11B is a diagram illustrating an example of a timing chart (after processing order change) of the error correcting processing and the privacy amplification processing according to the second embodiment. The timing chart of FIG. 11B illustrates that the latency occurs only in the first time slot in the privacy amplification processing, and that the processing proceeds smoothly after then.

As described above, in the quantum communication device 100 according to the second embodiment, the determination unit 5 determines the processing order of the error correcting processing by combining two pieces of the sift processing data in the same manner as in the first embodiment. Furthermore, when there are a plurality of pieces of sift processing data with the processing speed of the error correcting processing being identical to the processing speed of the privacy amplification processing, the determination unit 5 of the second embodiment determines the processing order so that the pieces of the sift processing data are combined and the error correcting processing is performed first. This allows the quantum communication device 100 of the present embodiment to reduce the processing time of the error correcting processing and the processing time of the privacy amplification processing, and thus allows efficient cryptographic key data generation.

Third Embodiment

Next, a third embodiment will be described. The third embodiment updates (optimizes) data stored in a storage 6 by feeding back relevant data (correction processing time, QbER, and privacy amplification processing time) obtained by a quantum communication device 100 performing processing. In the description of the third embodiment, description similar to description of the first embodiment will be omitted, and a different point from the first embodiment will be described in detail.

Figure 12:
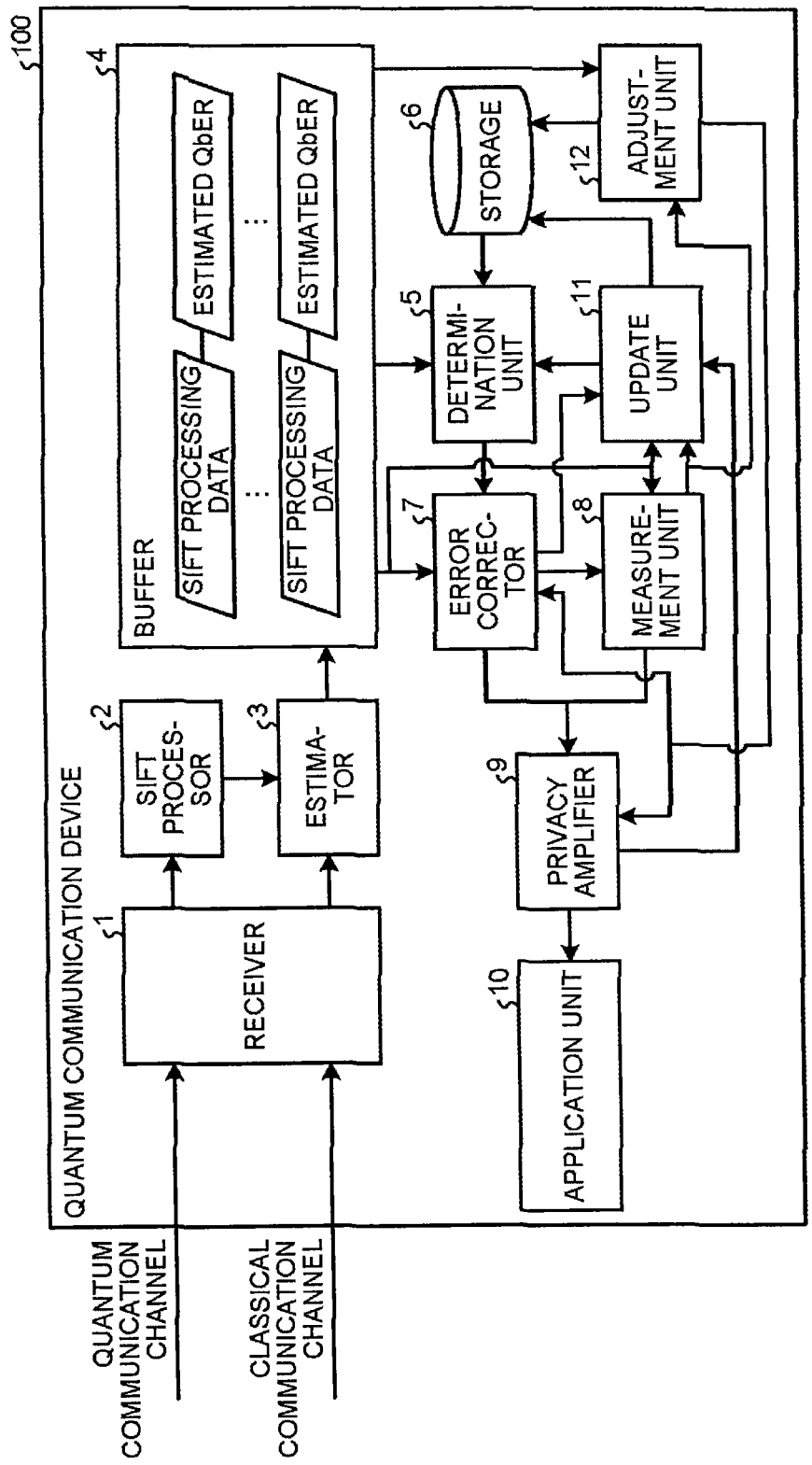
FIG. 12 is a diagram illustrating an example of the configuration of the quantum communication device according to a third embodiment.

FIG. 12 is a diagram illustrating an example of a configuration of the quantum communication device 100 according to the third embodiment. The quantum communication device 100 according to the third embodiment includes a receiver 1, a sift processor 2, an estimator 3, a buffer 4, a determination unit 5, the storage 6, an error corrector 7, a measurement unit 8, a privacy amplifier 9, an application unit 10, an update unit 11, and an adjustment unit 12. The receiver 1, the sift processor 2, the estimator 3, the buffer 4, and the application unit 10 are identical to those of the first embodiment, and thus description will be omitted.

The determination unit 5 determines whether a data volume of sift processing data stored in the buffer 4 is equal to or greater than a first threshold. When the data volume of the sift processing data stored in the buffer 4 is equal to or greater than the first threshold, the determination unit 5 determines order of the sift processing data in which an error is to be corrected based on an estimated QbER being associated with the sift processing data, an estimation error of the estimated QbER, and the above-described difference data according to the QbER. The determination unit 5 of the third embodiment does not use the estimated QbER being associated with the sift processing data as it is, and uses the estimated QbER after correction based on the estimation error of the estimated QbER to determine the order of the sift processing data in which an error is to be corrected.

The estimation error of the estimated QbER will be described below. FIG. 13 is a diagram illustrating an example of the estimation error of the estimated QbER according to the third embodiment. FIG. 13 illustrates the estimation error for each range of the estimated QbER. For example, when the range of the estimated QbER is $0 \leq QbER < (5e-3)$, the estimation error is a. The estimation error is a value calculated by the update unit 11 described later based on a difference between the estimated QbER estimated by the estimator 3 and the QbER measured by the measurement unit 8. Details of the estimation error will be described later.

The determination unit 5 receives a stop instruction of correction order determination processing described in the first embodiment from the update unit 11. On receipt of the stop instruction of the correction order determination processing, the determination unit 5 stops processing for determining the order of the sift processing data in which an error is to be corrected. That is, the error corrector 7 processes the sift processing data in the buffer 4 in time-series order.

The storage 6 stores the above-described difference data according to the QbER and an estimation error database. The above-described difference data according to the QbER is identical to the difference data in the first embodiment, and thus description will be omitted. The estimation error database stores the estimation error of the estimated QbER (see FIG. 13).

The error corrector 7 receives data indicating the order of the sift processing data to be corrected from the determination unit 5. The error corrector 7 performs correction processing of the sift processing data in the same manner as in the first embodiment, and generates error correcting processing data. At this time, the error corrector 7 of the second embodiment acquires the correction processing time actually required for the correction processing of the sift processing data. The error corrector 7 transmits, to the update unit 11, correction processing information including the correction processing time and identification information for identifying the sift processing data in which the correction processing time is to be acquired. In addition, the error corrector 7 transmits the error correcting processing data and identification information for identifying the sift processing data before the correction corresponding to the error correcting processing data to the privacy amplifier 9.

The measurement unit 8 measures the QbER of the sift processing data in the same manner as in the first embodiment. At this time, the measurement unit 8 of the third embodiment transmits, to the update unit 11, measurement information including the QbER and identification information for identifying the sift processing data in which the QbER is to be measured. The measurement unit 8 of the third embodiment transmits the QbER to the adjustment unit 12.

The privacy amplifier 9 receives, from the error corrector 7, the error correcting processing data and identification information about the sift processing data before the correction corresponding to the error correcting processing data, and receives the QbER of the error correcting processing data from the measurement unit 8. The privacy amplifier 9 performs the privacy amplification processing of the error correcting processing data in the same manner as in the first embodiment. At this time, the privacy amplifier 9 of the third embodiment acquires the privacy amplification processing time that is actually required in the privacy amplification processing of the error correcting processing data. The privacy amplifier 9 transmits, to the update unit 11, privacy amplification processing information including the privacy amplification processing time and the identification information about the sift processing data before the correction corresponding to the error correcting processing data in which the privacy amplification processing time is to be acquired.

The update unit 11 receives the above-described correction processing information from the error corrector 7, receives the above-described privacy amplification processing information from the privacy amplifier 9, and receives the above-described measurement information from the measurement unit 8. The update unit 11 acquires, from the buffer 4, the estimated QbER being associated with the sift processing data identified by the identification information about the sift processing data.

The update unit 11 updates the difference data according to the QbER in the storage 6 based on the QbER of the sift processing data, the correction processing time of the sift processing data, and the privacy amplification processing time of the error correcting processing data corresponding to the sift processing data. The update unit 11 calculates the estimation error from a difference between the estimated QbER and the QbER. The update unit 11 calculates an average of the estimation errors of the estimated QbER using the plurality of calculated estimation errors, and updates the estimation error of the estimated QbER with the average.

When the average of the estimation errors is equal to or greater than a second threshold, the update unit 11 does not update the estimation error. Instead of updating (optimizing) the data stored in the storage 6, the update unit 11 transmits the above-described stop instruction for stopping the correction order determination processing to the determination unit 5. This is because it is considered that an operating state of the error corrector 7 and the measurement unit 8, and an operating state of the estimator 3 lack consistency. That is, this is because, in such a state, it is better to perform maintenance work involving initialization of each database or the like, and to perform initialization (rebooting or the like) of the quantum communication device 100 than to feed back data obtained in actual correction processing and to update data in the storage 6.

The adjustment unit 12 receives the QbER from the measurement unit 8. Alternatively, the adjustment unit 12 acquires the estimated QbER from the buffer 4. The adjustment unit 12 calculates an average of the estimated QbERs or an average of the QbERs. The adjustment unit 12 acquires the QbER with the difference data of zero from the storage 6. Then, the adjustment unit 12 calculates a difference between the calculated average of the estimated QbERs or the average of the QbERs, and the QbER with the difference data of zero. When the difference is equal to or greater than a third threshold, the adjustment unit 12 adjusts the parallel computation number of the error corrector 7 and/or the parallel computation number of the privacy amplifier 9 so that the average of the estimated QbERs or the average of the QbERs coincides with the QbER with the difference data of zero.

The reason for such an adjustment is that the above-described correction order determination processing exerts its effect best when the average of the QbERs of the sift processing data to be processed coincides with the above-described QbER with the difference data of zero.

The adjustment unit 12 stores circuit data and parallel computation parameters corresponding to various parallel computation numbers in advance. For example, when signal processing is implemented by a field-programmable gate array (FPGA), the adjustment unit 12 stores a binary file showing a circuit configuration. When signal processing is implemented by software, the adjustment unit 12 stores a signal-processing program and a parameter. When a configuration is changed, the adjustment unit 12 performs selection from among candidates (circuit data, parallel computation parameter, and the like) in which the configuration of the error correcting processing and/or the privacy amplification processing is stored so that the average of the QbERs of the sift processing data to be processed and the above-described QbER with the difference data of zero become closest to each other.

The adjustment unit 12 also performs adjustment for allowing smooth performance of the error correcting processing and the privacy amplification processing. For example, when the QbER is very low and the error correcting processing is very fast, the privacy amplification processing becomes a bottleneck. Accordingly, for example, the adjustment unit 12 reduces the parallel computation number of the error correcting processing, or increases the parallel computation number of the privacy amplification processing, or performs both processing. This allows the adjustment unit 12 to perform the error correcting processing and the privacy amplification processing smoothly.

For initial setting of the parallel computation number, for example, an average of the QbERs of a quantum communication channel measured in advance is used before connecting the quantum communication device 100 to the quantum communication channel. That is, the initial setting is determined so that the measured QbER coincides with the QbER with throughput of the error correcting processing being identical to throughput of the privacy amplification processing.

Figure 14:
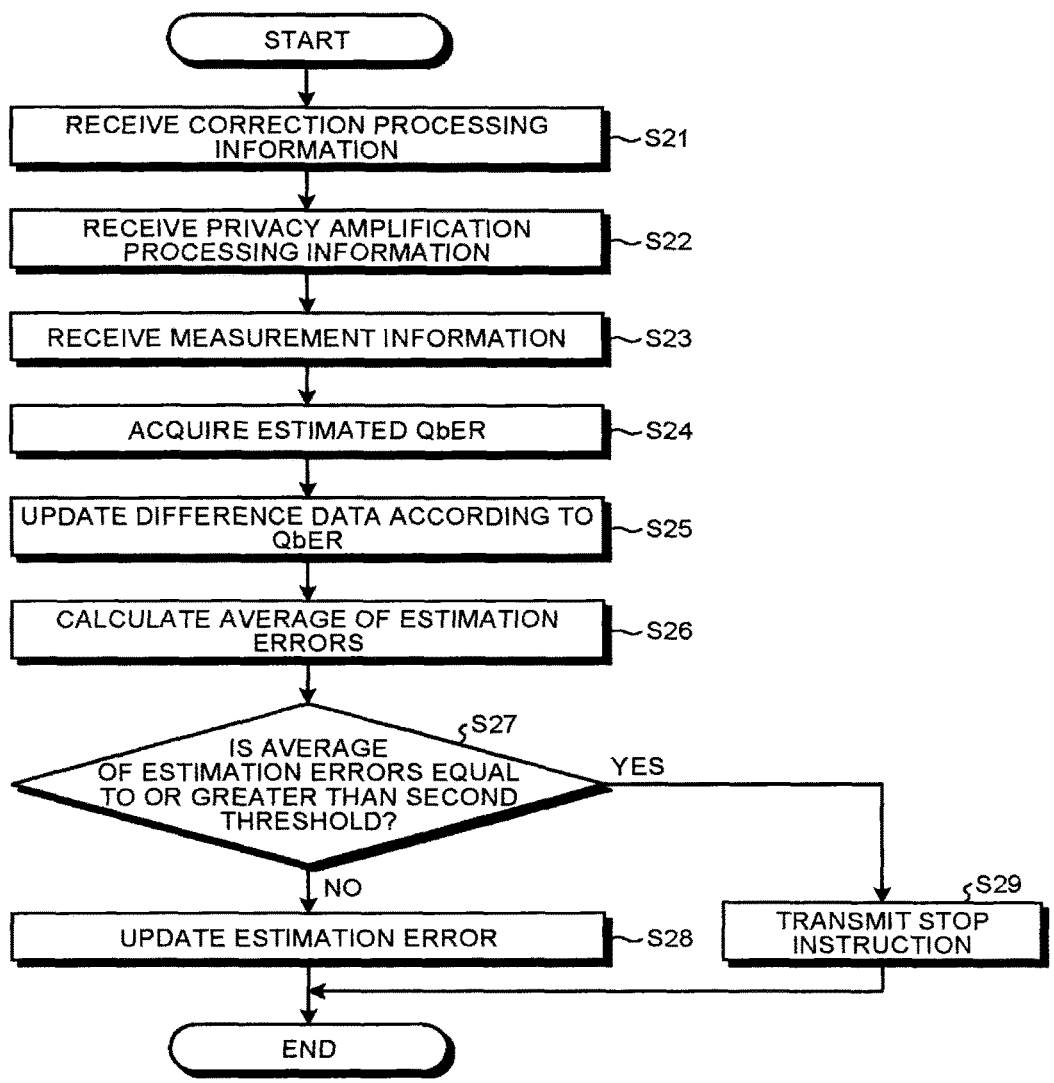
FIG. 14 is a flow chart illustrating an example of a method of operation of an update unit according to the third embodiment.

Next, an example of a method of operation of the update unit 11 of the third embodiment will be described with reference to a flow chart. FIG. 14 is a flow chart illustrating the example of the method of operation of the update unit 11 according to the third embodiment. The update unit 11 receives, from the error corrector 7, the correction processing information including the correction processing time and the identification information for identifying the sift processing data in which the correction processing time is to be acquired (step S21). Next, the update unit 11 receives, from the privacy amplifier 9, the privacy amplification processing information including the privacy amplification processing time and the identification information about the sift processing data before the correction corresponding to the error correcting processing data in which the privacy amplification processing time is to be acquired (step S22).

Next, the update unit 11 receives, from the measurement unit 8, the measurement information including the QbER and the identification information for identifying the sift processing data in which the QbER is to be measured (step S23). Next, the update unit 11 acquires, from the buffer 4, the estimated QbER being associated with the sift processing data identified by the identification information about the sift processing data (step S24).

Next, the update unit 11 updates the difference data according to the QbER in the storage 6 based on the QbER of the sift processing data, the correction processing time of the sift processing data, and the privacy amplification processing time of the error correcting processing data corresponding to the sift processing data (step S25).

Next, the update unit 11 calculates the estimation error from the difference between the estimated QbER and the QbER, and calculates the average of the estimation errors of the estimated QbER using the plurality of calculated estimation errors (step S26). The update unit 11 determines whether the average of the estimation errors is equal to or greater than the second threshold (step S27). When the average is equal to or greater than the second threshold (step S27, Yes), the update unit 11 transmits the above-described stop instruction for stopping the correction order determination processing (step S29). When the average is smaller than the second threshold (step S27, No), the update unit 11 updates the estimation error of the estimated QbER with the average (step S28).

Figure 15:
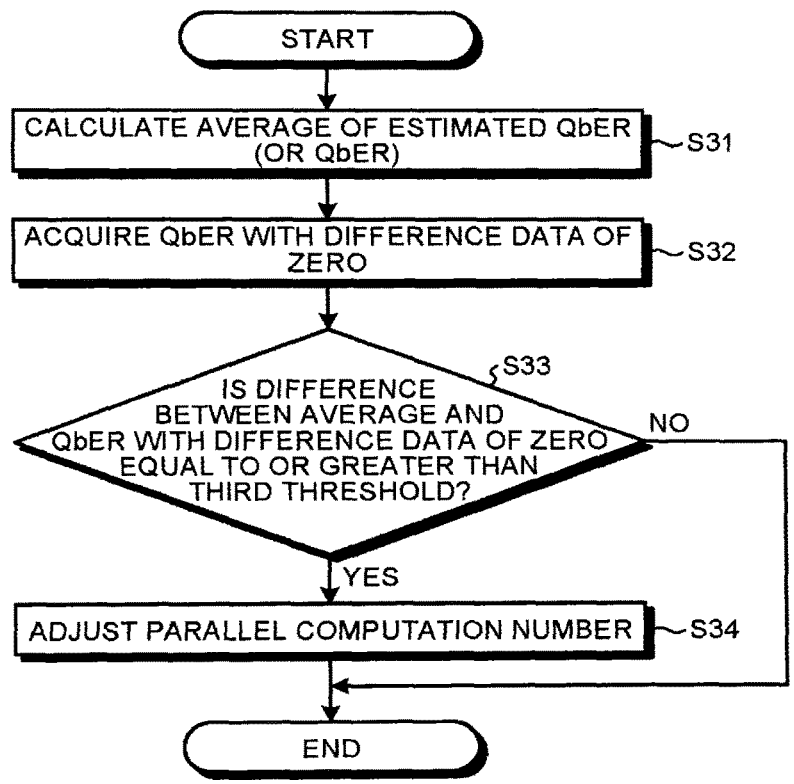
FIG. 15 is a flow chart illustrating an example of a method of operation of an adjustment unit according to the third embodiment.

Next, an example of a method of operation of the adjustment unit 12 of the third embodiment will be described with reference to a flow chart. FIG. 15 is a flow chart illustrating the example of the method of operation of the adjustment unit 12 according to the third embodiment. The adjustment unit 12 calculates the average of the estimated QbERs or the average of the QbERs (step S31). Next, the adjustment unit 12 acquires the QbER with the difference data of zero from the storage 6 (step S22). Next, the adjustment unit 12 determines whether the difference between the calculated average of the estimated QbERs (or the average of the QbERs) and the QbER with the difference data of zero is equal to or greater than the third threshold (step S33). When the difference is equal to or greater than the third threshold (step S33, Yes), the adjustment unit 12 adjusts the parallel computation number of the error corrector 7 and/or the parallel computation number of the privacy amplifier 9 so that the average of the estimated QbERs (or the average of the QbERs) coincides with the QbER with the difference data of zero (step S34). When the difference is not equal to or greater than the third threshold, the adjustment unit 12 ends processing (step S33, No).

As described above, in the quantum communication device 100 according to the third embodiment, the update unit 11 updates the above-described difference data according to the QbER based on the correction processing time fed back from the error corrector 7, the QbER fed back from the measurement unit 8, and the privacy amplification processing time fed back from the privacy amplifier 9. The update unit 11 calculates the estimation error from the difference between the estimated QbER and the QbER, calculates the average of the estimation errors of the estimated QbER using the plurality of calculated estimation errors, and updates the estimation error of the estimated QbER with the average. This allows the quantum communication device 100 of the third embodiment to optimize and improve processing of the estimator 3 and the determination unit 5.

In the quantum communication device 100 of the third embodiment, when the difference between the average of the estimated QbERs (or the average of the QbERs) and the QbER with the difference data of zero is equal to or greater than the third threshold, the adjustment unit 12 adjusts the parallel computation number of the error corrector 7 and/or the parallel computation number of the privacy amplifier 9 so that the average of the estimated QbERs (or the average of the QbERs) coincides with the QbER with the difference data of zero. This allows the quantum communication device 100 of the third embodiment to optimize processing of the determination unit 5 so that the above-described correction order determination processing best exerts its effect.

Fourth Embodiment

Next, a fourth embodiment will be described. A quantum communication device 100 of the fourth embodiment receives a cryptographic key bit string from a plurality of devices. In the description of the fourth embodiment, description similar to description of the first embodiment will be omitted, and a different point from the first embodiment will be described in detail. The quantum communication device 100 of the fourth embodiment is used in a quantum access network (QAN) in which a key is shared by quantum key distribution by one-to-many nodes.

Figure 16:
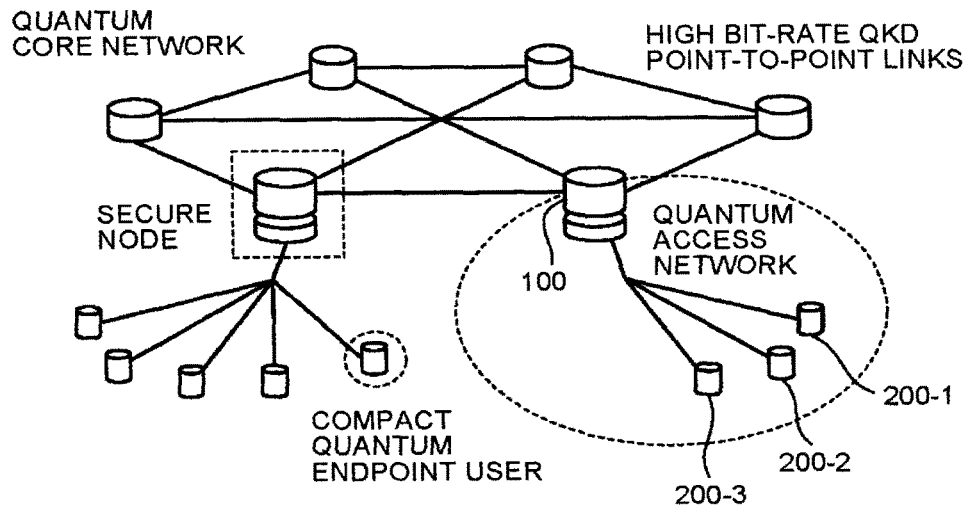
FIG. 16 is a diagram illustrating an example of a quantum access network (QAN) according to a fourth embodiment.

FIG. 16 is a diagram illustrating an example of the quantum access network (QAN). In the example of FIG. 16, the quantum communication device 100 is connected to a quantum core network (QCN). Three devices 200 that each transmit a cryptographic key bit string are connected to the quantum communication device 100. In the example of FIG. 16, the quantum access network (QAN) includes the quantum communication device 100 and the three devices 200. Here, the number of the devices 200 may be any number, but in the description of the present embodiment, the number of the devices 200 is assumed to be three for simplicity.

Figure 17:
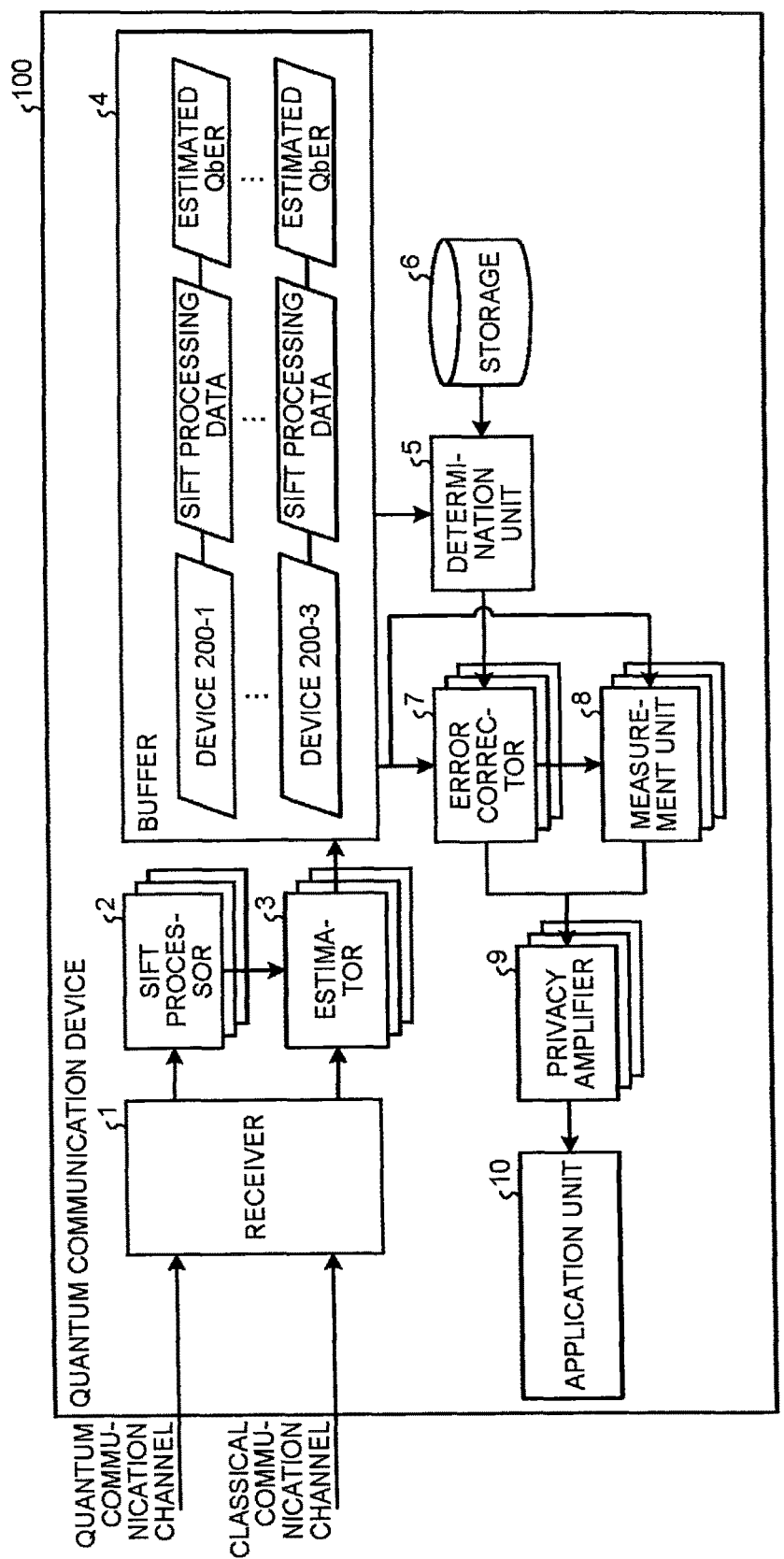
FIG. 17 is a diagram illustrating an example of the configuration of the quantum communication device according to the fourth embodiment.

FIG. 17 is a diagram illustrating an example of a configuration of the quantum communication device 100 according to the fourth embodiment. The quantum communication device 100 according to the fourth embodiment is configured such that, among components of the quantum communication device 100 of the first embodiment, sift processors 2, estimators 3, error correctors 7, measurement units 8, and privacy amplifiers 9 are multiplexed. This allows the quantum communication device 100 to generate cryptographic key data for each device 200 without delay even when receiving the cryptographic key bit string from the plurality of devices 200.

In the example of FIG. 17, the sift processors 2, the estimators 3, the error correctors 7, the measurement units 8, and the privacy amplifiers 9 are all multiplexed by the number of the transmission side devices 200 (three in the present embodiment). However, it is not necessary to set multiplicity identical to the number of the transmission side devices 200, and the multiplicity may be changed depending on a processing load of each functional block.

The buffer 4 further associates identification information for identifying the transmission side devices 200 with sift processing data and an estimated QbER, and stores the identification information, the sift processing data, and the estimated QbER. The identification information about each device 200 is referred to when an application unit 10 identifies the cryptographic key data for each device 200.

The determination unit 5 determines order of the sift processing data in which an error is to be corrected in the same manner as in the first embodiment without referring to the identification information about the devices 200. That is, the determination unit 5 determines the order of the sift processing data in which an error is to be corrected by mixing the plurality of pieces of sift processing data generated from the cryptographic key bit strings transmitted from separate devices. The determination unit 5 transmits data showing the order of the sift processing data to be corrected to the error corrector 7 with the smallest processing load among three error correctors 7.

The error corrector 7 performs correction processing of the sift processing data in the same manner as in the first embodiment. At this time, the error corrector 7 acquires, from the buffer 4, one piece of sift processing data among the plurality of pieces of sift processing data and the identification information about the device 200 that transmits the sift processing data in the order determined by the determination unit 5. The error corrector 7 transmits error correcting processing data and the identification information about the device 200 to the privacy amplifier 9 having the smallest processing load among the three privacy amplifiers 9. The error corrector 7 transmits the error correcting processing data, the identification information about the device 200, and identification information for identifying the privacy amplifier 9 that transmits measured QbER, to the measurement unit 8 having the smallest processing load among the three measurement units 8.

The measurement unit 8 receives, from the error corrector 7, the error correcting processing data, the identification information about the device 200, and the identification information for identifying the privacy amplifier 9 that transmits the measured QbER. The measurement unit 8 acquires the sift processing data before the correction corresponding to the error correcting processing data from the buffer 4. The measurement unit 8 measures the QbER of the sift processing data by comparing the error correcting processing data with the sift processing data before the correction corresponding to the error correcting processing data. The measurement unit 8 transmits the identification information about the device 200 and the measured QbER to the privacy amplifier 9 identified by the identification information about the privacy amplifier 9 received from the error corrector 7.

The privacy amplifier 9 receives the error correcting processing data and the identification information about the device 200 that transmits the sift processing data from the error corrector 7, and receives the identification information about the device 200 and the QbER of the error correcting processing data from the measurement unit 8. The privacy amplifier 9 performs privacy amplification processing of the error correcting processing data based on the QbER of the error correcting processing data. Then, the privacy amplifier 9 uses the bit string obtained by privacy amplification processing of the error correcting processing data to generate the cryptographic key data to be shared. The privacy amplifier 9 transmits the identification information about the device 200 and the generated cryptographic key data to the application unit 10.

The application unit 10 receives the identification information about the device 200 and the cryptographic key data from the privacy amplifier 9. The application unit 10 combines the cryptographic key data for each transmission side device 200, and performs encryption and decryption of data using the cryptographic key data for each device 200. The application unit 10 transmits and receives the encrypted data with the transmission side device 200.

As described above, in the quantum communication device 100 of the fourth embodiment, the buffer 4 associates the identification information about the transmission side device 200 with the sift processing data and the estimated QbER, and stores the identification information, the sift processing data, and the estimated QbER. The determination unit 5, the error corrector 7, and the measurement unit 8 perform processing without identifying the transmission side device 200. The privacy amplifier 9 uses the bit string obtained by privacy amplification processing of the error correcting processing data to generate the cryptographic key data to be shared for each transmission side device 200. This allows the quantum communication device 100 of the fourth embodiment to perform the error correcting processing efficiently even when communicating with the plurality of devices 200.

In the quantum communication device 100 of the fourth embodiment, processing of the determination unit 5, the error corrector 7, the measurement unit 8, and the privacy amplifier 9 is performed without identifying the device 200, but the processing may be performed for each device 200.

In the quantum communication device 100 of the fourth embodiment, the determination unit 5 transmits data to the error corrector 7 with the smallest processing load among the three error correctors 7, but the data may be allocated to each error corrector 7 so that processing time becomes uniform. The determination unit 5 may allocate data so that all check matrices used in each error corrector 7 are identical to each other. That is, the determination unit. 5 may allocate the data to each error corrector 7 according to the check matrix used for correction of each piece of sift processing data.

In the quantum communication device 100 of the fourth embodiment, the error corrector 7 transmits the error correcting processing data and the identification information about the device 200 to the privacy amplifier 9, but the error correcting processing data and the identification information about the device 200 may be transmitted from the measurement unit 8 to the privacy amplifier 9. This eliminates the need for the error corrector 7 to transmit the identification information for identifying the destination privacy amplifier 9 to the measurement unit 8.

In addition, a shared memory may be placed between the plurality of error correctors 7 and the plurality of privacy amplifiers 9. That is, the error corrector 7 may store the error correcting processing data in the shared memory and store the measured QbER in the shared memory, and the privacy amplifier 9 may acquire the error correcting processing data and the QbER stored in the shared memory. Also in this case, when inputting the data in the privacy amplifier 9, it is preferable to input the data while maintaining a combination of processing and processing order that are determined by the determination unit 5.

The second embodiment and the third embodiment may be combined. That is, data stored in the storage 6 may be updated (optimized) by feeding back relevant data (correction processing time, QbER, and privacy amplification processing time) obtained by performing processing in the quantum communication device 100. At this time, optimization may be performed without identifying the transmission side device 200, and optimization may be performed for each transmission side device 200. When optimization is performed for each transmission side device 200, the determination unit 5, the error corrector 7, the measurement unit 8, and the privacy amplifier 9 perform processing by identifying the transmission side device 200, and identifies which device 200 the relevant data used for feedback is about.

Figure 18:
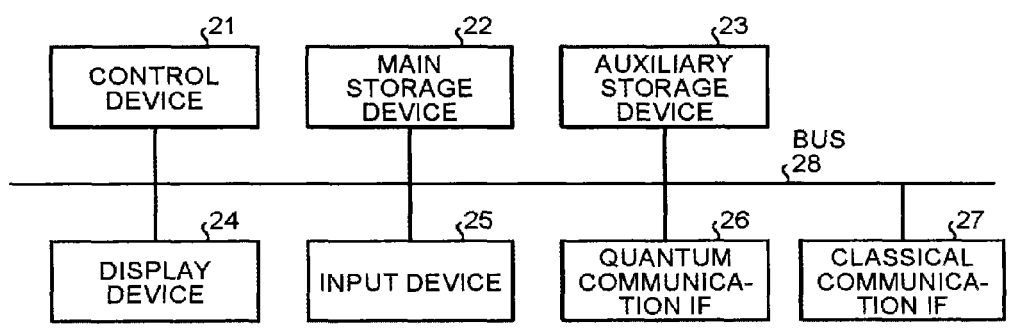
FIG. 18 is a diagram illustrating an example of the configuration of the quantum communication device according to the first to fourth embodiments.

Finally, an example of a hardware configuration of the quantum communication device 100 of the first to fourth embodiments will be described. FIG. 18 is a diagram illustrating the example of the configuration of the quantum communication device 100 according to the first to fourth embodiments. The quantum communication device 100 according to the first to fourth embodiments includes a control device 21, a main storage device 22, an auxiliary storage device 23, a display device 24, an input device 25, a quantum communication IF 26, and a classical communication IF 27. The control device 21, the main storage device 22, the auxiliary storage device 23, the display device 24, the input device 25, the quantum communication IF 26, and the classical communication IF 27 are connected to each other via a bus 28. The quantum communication device 100 may be an arbitrary device that has the above-described hardware configuration. For example, the quantum communication device 100 is a personal computer (PC), a mobile terminal, and the like.

The control device 21 executes a program read from the auxiliary storage device 23 to the main storage device 22. The main storage device 22 is a memory such as a ROM and a RAM. The auxiliary storage device 23 is a hard disk drive (HDD), a memory card, and the like. The display device 24 displays a state of the quantum communication device 100 or the like. The input device 25 receives an input from a user. The quantum communication IF 26 is an interface for connection to a quantum communication channel. The classical communication IF 27 is an interface for connection to a classical communication channel.

The program executed in the quantum communication device 100 of the first to fourth embodiments is an installable file or an executable file. The program is stored in a computer-readable storage medium such as a CD-ROM, a memory card, a CD-R, and a digital versatile disk (DVD), and is provided as a computer program product.

The program executed in the quantum communication device 100 of the first to fourth embodiments may be configured to be stored in a computer connected to a network, such as the Internet, and to be provided by allowing download via the network. The program executed in the quantum communication device 100 of the first to fourth embodiments may be configured to be provided via the network, such as the Internet, without allowing download.

The program of the quantum communication device 100 of the first to fourth embodiments may be configured to be incorporated in a ROM or the like in advance and to be provided.

The program executed in the quantum communication device 100 of the first to fourth embodiments has a modular configuration including the above-described respective functional blocks (receiver 1, sift processor 2, estimator 3, determination unit 5, error corrector 7, measurement unit 8, privacy amplifier 9, application unit 10, update unit 11, and adjustment unit 12). As actual hardware, the respective functional blocks are loaded in the main storage device 22 by the control device 21 reading the program from the storage medium and executing the program. That is, the respective functional blocks are generated in the main storage device 22.

Part or all of the above-described respective units (receiver 1, sift processor 2, estimator 3, determination unit 5, error corrector 7, measurement unit 8, privacy amplifier 9, application unit 10, update unit 11, and adjustment unit 12) may not be achieved by software but be achieved by hardware, such as an integrated circuit (IC).

As described above, according to the quantum communication device 100 of the first to fourth embodiments, it is possible to reduce the processing time of the error correcting processing and the processing time of the privacy amplification processing, and thus it is possible to generate the cryptographic key data efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum communication device comprising:
   a receiver configured to
     receive a cryptographic key bit represented by one basis among a plurality of bases using a quantum state of a photon via a quantum communication channel, and
     acquire a cryptographic key bit string including a plurality of received cryptographic key bits;
   a sift processor configured to acquire sift processing data by referring to cryptographic key bit string in a predetermined bit string with a reference basis randomly selected from the plurality of bases;
   an estimator configured to acquire an estimated error rate by estimating an error rate of the sift processing data from an error rate of part of the sift processing data;
   a first storage configured to store the sift processing data and the estimated error rate in association with each other;
   a second storage configured to store difference data indicating a difference between a processing speed of error correcting processing of the sift processing data and a processing speed of privacy amplification processing of the sift processing data for each of error rates of a plurality of sift processing data;
   a determination unit configured to determine order of the sift processing data in which an error is to be corrected based on the estimated error rate and the difference data when a data volume of the sift processing data stored in the first storage is equal to or greater than a first threshold;
   a corrector configured to
     acquire one piece of the sift processing data from among the plurality of pieces of sift processing data from the first storage in the order determined by the determination unit, and
     generate error correcting processing data by correcting the acquired sift processing data by the error correcting processing;
   a measurement unit configured to measure the error rate of the sift processing data before correction by comparing the error correcting processing data with the sift processing data before the correction corresponding to the error correcting processing data; and
   a privacy amplifier configured to generate cryptographic key data based on the error rate measured by the measurement unit by applying the privacy amplification processing to the error correcting processing data.

2. The device according to claim 1, wherein
   the receiver is configured to receive part of the sift processing data via a classical communication channel from a transmission side device that transmits the cryptographic key bit string, and
   the estimator is configured to acquire the estimated error rate of the sift processing data based on data corresponding to part of the sift processing data received via the classical communication channel among the sift processing data acquired by the sift processor, and on part of the sift processing data received by the receiver via the classical communication channel.

3. The device according to claim 1, wherein
   the determination unit is configured to
     acquire a plurality of pieces of difference data by acquiring piece of the difference data corresponding to the error rate that coincides with the estimated error rate, each of the estimated error rates being associated with the sift processing data,
     combine two pieces of the difference data among the plurality of pieces of difference data so that a sum of the two pieces of difference data is close to zero,
     order the combined difference data, and
     determine, by using the order of the combined difference data, the order of the plurality of the sift processing data, in each of which an error is to be corrected, each of the sift processing data being associated with the estimated error rate that coincides with the error rate corresponding to piece of the difference data.

4. The device according to claim 3, wherein the determination unit is configured to determine the order so that the error is corrected, starting from the sift processing data associated with the estimated error rate that coincides with the error rate with a smaller error rate corresponding to the difference data among the difference data included in the combined difference data.

5. The device according to claim 3, wherein the determination unit is configured to order the combined difference data in order of the combined difference data with a sum of absolute values of two pieces of the difference data closer to zero.

6. The device according to claim 1, wherein
   the corrector is configured to acquire correction processing time indicating time required for error correcting processing of the sift processing data, the privacy amplifier is configured to acquire privacy amplification processing time indicating time required for privacy amplification processing of the error correcting processing data, and the device further comprises an update unit configured to update the difference data based on the correction processing time and the privacy amplification processing time.

7. The device according to claim 6, wherein
the second storage further stores an estimation error of the estimated error rate,
the update unit is configured to
  calculate the estimation error from a difference between the estimated error rate and the error rate measured by the measurement unit,
  calculate an average of the estimation errors using a plurality of calculated estimation errors, and
  update the estimation error of the estimated error rate with the average of the estimation errors, and
the determination unit is configured to determine order of the sift processing data in which an error is to be corrected further based on the estimation error of the second storage.

8. The device according to claim 7, wherein,
the update unit is configured to transmit, to the determination unit, a stop notification for stopping processing for determining the order of the sift processing data in which an error is to be corrected without updating the estimation error of the estimated error rate with the average of the estimation errors, when the average of the estimation errors is equal to or greater than a second threshold, and
the determination unit is configured to stop, on receipt of the stop notification, processing for determining the order of the sift processing data in which an error is to be corrected.

9. The device according to claim 1, further comprising
an adjustment unit configured to
  calculate an average of the estimated error rates or an average of the error rates, and
  adjust a parallel computation number of the error corrector or a parallel computation number of the privacy amplifier so that the average of the estimated error rates or the average of the error rates coincides with the error rate with the difference data being 0 when a difference between the calculated average of the estimated error rates or the average of the error rates and the error rate with the difference data being zero is equal to or greater than a third threshold.

10. A quantum communication method comprising:
receiving a cryptographic key bit represented by one basis among a plurality of bases using a quantum state of a photon via a quantum communication channel;
acquiring a cryptographic key bit string including a plurality of received cryptographic key bits;
acquiring sift processing data by referring to the cryptographic key bit string in a predetermined bit string with a reference basis randomly selected from the plurality of bases;
acquiring an estimated error rate by estimating an error rate of the sift processing data from an error rate of part of the sift processing data;
storing, in a first storage, the sift processing data and the estimated error rate in association with each other;
storing, in a second storage, difference data indicating a difference between a processing speed of error correcting processing of the sift processing data and a processing speed of privacy amplification processing of the sift processing data for each of error rates of a plurality of sift processing data;
determining order of the sift processing data in which an error is to be corrected based on the estimated error rate and the difference data when a data volume of the sift processing data stored in the first storage is equal to or greater than a first threshold;
acquiring one piece of the sift processing data from among the plurality of pieces of sift processing data from the first storage in the order determined at the determining;
generating error correcting processing data by correcting the acquired sift processing data by the error correcting processing;
measuring the error rate of the sift processing data before correction by comparing the error correcting processing data with the sift processing data before the correction corresponding to the error correcting processing data; and
generating cryptographic key data based on the error rate measured by the measurement unit by applying the privacy amplification processing to the error correcting processing data.

11. A computer program product comprising a non-transitory computer-readable medium containing a program, the program causing a computer to execute:
receiving a cryptographic key bit represented by one basis among a plurality of bases using a quantum state of a photon via a quantum communication channel;
acquiring a cryptographic key bit string including a plurality of received cryptographic key bits;
acquiring sift processing data by referring to the cryptographic key bit string in a predetermined bit string with a reference basis randomly selected from the plurality of bases;
acquiring an estimated error rate by estimating an error rate of the sift processing data from an error rate of part of the sift processing data;
storing, in a first storage, the sift processing data and the estimated error rate in association with each other;
storing, in a second storage, difference data indicating a difference between a processing speed of error correcting processing of the sift processing data and a processing speed of privacy amplification processing of the sift processing data for each of error rates of a plurality of sift processing data;
determining order of the sift processing data in which an error is to be corrected based on the estimated error rate and the difference data when a data volume of the sift processing data stored in the first storage is equal to or greater than a first threshold;
acquiring one piece of the sift processing data from among the plurality of pieces of sift processing data from the first storage in the order determined at the determining;
generating error correcting processing data by correcting the acquired sift processing data by the error correcting processing;
measuring the error rate of the sift processing data before correction by comparing the error correcting processing data with the sift processing data before the correction corresponding to the error correcting processing data; and generating cryptographic key data based on the error rate measured by the measurement unit by applying the privacy amplification processing to the error correcting processing data.

\* \* \* \* \*